(12) United States Patent
Abramov

(10) Patent No.: US 10,894,456 B2
(45) Date of Patent: Jan. 19, 2021

(54) VEHICLE WITH A FRONT AND / OR REAR STEERING MECHANISM, BASED ON APPLICATION OF A LATERAL, HORIZONTAL FORCE ON THE VEHICLE'S CHASSIS

(71) Applicant: D.S. RAIDER LTD., Moshav Hagor (IL)

(72) Inventor: Erez Abramov, Moshav Hagor (IL)

(73) Assignee: D.S. RAIDER LTD., Moshav Hagor (IL)

( * ) Notice: Subject to any disclaimer, the term of this patent is extended or adjusted under 35 U.S.C. 154(b) by 37 days.

(21) Appl. No.: 16/326,953

(22) PCT Filed: Aug. 20, 2017

(86) PCT No.: PCT/IL2017/050924
§ 371 (c)(1),
(2) Date: Feb. 21, 2019

(87) PCT Pub. No.: WO2018/037400
PCT Pub. Date: Mar. 1, 2018

(65) Prior Publication Data
US 2019/0193500 A1    Jun. 27, 2019

Related U.S. Application Data

(60) Provisional application No. 62/377,657, filed on Aug. 21, 2016.

(51) Int. Cl.
*B60G 3/14*    (2006.01)
*B62K 5/003*   (2013.01)

(52) U.S. Cl.
CPC ............. *B60G 3/145* (2013.01); *B62K 5/003* (2013.01); *B60G 2200/13* (2013.01); *B60G 2300/20* (2013.01); *B60G 2300/45* (2013.01)

(58) Field of Classification Search
CPC .......................... B60G 3/145; B60G 2200/13; B60G 2300/20; B60G 2300/45; B62K 5/003
See application file for complete search history.

(56) References Cited

U.S. PATENT DOCUMENTS 4,043,585 A    8/1977  Yamanaka
5,739,603 A    4/1998  Darceot
(Continued)

FOREIGN PATENT DOCUMENTS

FR    2968626 A1    6/2011
FR    2996205 A1    4/2014

*Primary Examiner* — Faye M Fleming
(74) *Attorney, Agent, or Firm* — Browdy and Neimark, P.L.L.C.

(57) ABSTRACT

A vehicle comprising: •a front wheel set and a rear wheel set, each set comprising two wheels and an axle attached to the said wheels; •a base structure or chassis; •a front elastic pivot structure, connecting the front wheel set to the chassis, wherein said front elastic pivot structure comprises a front set of at least one elastic joint, enabling the chassis to tilt along a front roll axis in respect to the said front wheel set; •a front shock absorber, associated with the front wheel set; •a rear elastic pivot structure, associated with the rear wheel set, wherein said rear elastic pivot structure comprises a rear set of at least one elastic joint, enabling the chassis to tilt along a rear roll axis in respect to the said rear wheel set; and •a rear shock absorber, associated with the rear wheel set.

15 Claims, 16 Drawing Sheets

(56) References Cited

U.S. PATENT DOCUMENTS

| | | | |
|---|---|---|---|
| 8,020,878 B2 * | 9/2011 | Hara | B60G 21/05 280/5.509 |
| 9,248,857 B2 | 2/2016 | Spahl | |
| 10,501,119 B2 * | 12/2019 | Doerksen | B62D 9/02 |
| 2003/0141689 A1 | 7/2003 | Hamy | |
| 2004/0036243 A1 | 2/2004 | Chang | |
| 2008/0111336 A1 * | 5/2008 | Aubarede | B60G 7/008 280/124.128 |
| 2011/0272900 A1 * | 11/2011 | Lares | B62D 21/14 280/5.513 |
| 2013/0161919 A1 * | 6/2013 | Gaillard-Groleas | B60G 99/00 280/124.103 |
| 2016/0152296 A1 | 6/2016 | Eckert | |
| 2018/0257728 A1 * | 9/2018 | Kanehara | B62K 5/08 |
| 2020/0102037 A1 * | 4/2020 | Hirayama | B62K 5/10 |

* cited by examiner

VEHICLE WITH A FRONT AND / OR REAR STEERING MECHANISM, BASED ON APPLICATION OF A LATERAL, HORIZONTAL FORCE ON THE VEHICLE'S CHASSIS

FIELD OF THE INVENTION

The present invention generally relates to steering mechanisms for vehicles, and more particularly to combining front and rear wheel steering by applying a lateral, horizontal force to the vehicle's chassis.

BACKGROUND OF THE INVENTION

The usage of All Terrain Vehicles (ATVs) has become ubiquitous in recent years, as new types and designs of such vehicles have appeared in the market. ATVs are employed for recreational purposes, as well as for providing swift access for emergency forces to remote, isolated locations.

Modern ATVs are normally associated with an extreme, sportive type of riding, which excludes the requirements of the more conservative populace, which exhibits a more restrained type of riding. A configurable design for a vehicle that facilitates both types of riding experiences is therefore required.

SUMMARY OF THE INVENTION

The present invention discloses a vehicle comprising:
a front wheel set and a rear wheel set, each set comprising two wheels and an axle attached to the said wheels;
a base structure or chassis;
a front elastic pivot structure, connecting the front wheel set to the chassis, wherein said front elastic pivot structure comprises a front set of at least one elastic joint, enabling the chassis to tilt along a front roll axis in respect to the said front wheel set;
a front shock absorber, associated with the front wheel set;
a rear elastic pivot structure, associated with the rear wheel set, wherein said rear elastic pivot structure comprises a rear set of at least one elastic joint, enabling the chassis to tilt along a rear roll axis in respect to the said rear wheel set; and
a rear shock absorber, associated with the rear wheel set;
According to some embodiments of the present invention:
said rear elastic pivot structure comprises an upper suspension plate and a middle suspension plate;
said upper suspension plate of the rear elastic pivot structure is attached to the said chassis;
said middle suspension plate of the rear elastic pivot structure is attached to the rear wheel set and rear shock absorber; and
said plates are attached via one or more elastic joints, thereby enabling the said plates to tilt in respect to each other along a roll axis, facilitating a tilt of the chassis in respect to the rear wheel set along a rear roll axis.
According to some embodiments of the present invention:
said front elastic pivot structure comprises an upper suspension plate and a middle suspension plate;
said upper suspension plate of the front elastic pivot structure is attached to the said chassis;
said middle suspension plate of the front elastic pivot structure is attached to the front wheel set and front shock absorber; and
said plates are attached via one or more elastic joints, thereby enabling the said plates to tilt in respect to each other along a roll axis, facilitating a tilt of the chassis in respect to the front wheel set along a front roll axis.
According to some embodiments of the present invention:
said chassis comprises a substantially horizontal standing platform, capable of carrying at least one driver;
said front elastic pivot structure and rear elastic pivot structure are substantially vertically aligned, thus the imaginary line connecting said elastic pivot structures is substantially horizontal.
said horizontal standing platform is lower than the horizontal line connecting said front elastic pivot structure and rear elastic pivot structure.

According to some embodiments of the present invention, said elastic pivot structures comprise a set of two elastic rubber joints, secured between the middle suspension plate and the upper suspension plate by a set of bolts.

According to some embodiments of the present invention, said elastic pivot structures further comprise a set of elastic rubber joints, secured above the upper suspension plate by the same set of bolts, between the upper suspension plate and a set of tighteners.

According to some embodiments of the present invention:
said upper suspension plate of the elastic pivot structure further comprises a housing for holding said rubber elastic joints; and
said housings comprise a groove, enabling said bolts to move laterally in respect to said upper suspension plate, hence enabling said upper suspension plate to move laterally in relation to said middle suspension plate, and enabling said chassis to move laterally in relation to said wheel sets.

According to some embodiments of the present invention:
said rear elastic pivot structure further comprises at least one ball joint, attached to the upper suspension plate, in the location of said housing;
wherein said ball joint(s) are configured to secure said bolts into place and prevent said bolts from moving laterally along said grooves, thus preventing said upper suspension plate from moving laterally in relation to said middle suspension plate; and
wherein said ball joint(s) are configured to enable the bolts to rotate around the location of said ball joint(s), hence enabling said upper suspension plate to tilt in relation to said middle suspension plate, and enabling the chassis to tilt along the rear roll axis in relation to the rear wheel set According to some embodiments of the present invention:
said front elastic pivot structure further comprises at least one ball joint, attached to the upper suspension plate, in the location of said housing;
wherein said ball joint(s) are configured to secure said bolts into place and prevent said bolts from moving laterally along said grooves, thus preventing the said upper suspension plate from moving laterally in relation to said middle suspension plate; and
wherein said ball joint(s) are configured to enable the bolts to rotate around the location of said ball joint(s), hence enabling said upper suspension plate to tilt in relation to said middle suspension plate, and enabling the chassis to tilt along the front roll axis in relation to the front wheel set.

According to some embodiments of the present invention, the said ball joints may be fully installed or partially installed or not installed within the front elastic pivot structure and rear elastic pivot structure, to produce different levels of front and rear wheel steering in response to a lateral, horizontal force applied to the chassis.

According to some embodiments of the present invention, said elastic joints are implemented as springs or pistons or any combination thereof.

According to some embodiments of the present invention, the chassis [1010] is directly attached to the said elastic joints.

According to some embodiments of the present invention:
the chassis' rear part is angled upwards, toward the rear of the vehicle along the said rear roll axis;
said angle displaces the midpoint of the rear wheels from beneath the rear elastic joints set to an extended position towards the rear of the vehicle;
said angle of the chassis elongates a distance vector, that is perpendicular to said rear roll axis, and intercepts the rear wheels' point of contact with the ground; and
said angle of the chassis elongates a horizontal distance vector, between the horizontal positions of the wheel's contact point with the ground and the mid-point between the rear elastic joints.

According to some embodiments of the present invention:
the chassis' front part is angled upwards, toward the front of the vehicle along the said front roll axis;
said angle displaces the midpoint of the rear wheels from beneath the rear elastic joints set to an extended position towards the front of the vehicle; and
said angle of the chassis elongates a horizontal distance vector, between the horizontal positions of the wheel's contact point with the ground and the mid-point between the front elastic joints.

According to some embodiments of the present invention, the said vehicle enables the driver to lock the wheels of the rear wheel set together, forcing them to rotate at the same speed in a synchronized mode, by providing a synchronized electric control signal to both wheels of the rear wheel set.

According to some embodiments of the present invention, the said lock is obtained mechanically, by physically associating the rear wheels through a joint axle.

According to some embodiments of the present invention, the components bearing the load between the ground and said rear shock absorber include only the rear wheel set and the rear axle, and do not include said suspension plates, elastic joints, and said elastic joint bolts, thus minimizing the total mass that follows the ground through pitch movement of a rear pitch pivot axle.

According to some embodiments of the present invention, the components bearing the load between the ground and the elastic joints of the rear wheel set is minimal, and includes only the said rear wheel set, the rear axle, said rear shock absorber and said medium suspension plate, thus minimizing the mass of the load-bearing components between the ground and the elastic joints, and enhancing the following of the ground in roll motion.

DETAILED DESCRIPTION OF SOME EMBODIMENTS OF THE INVENTION

Figure 1:
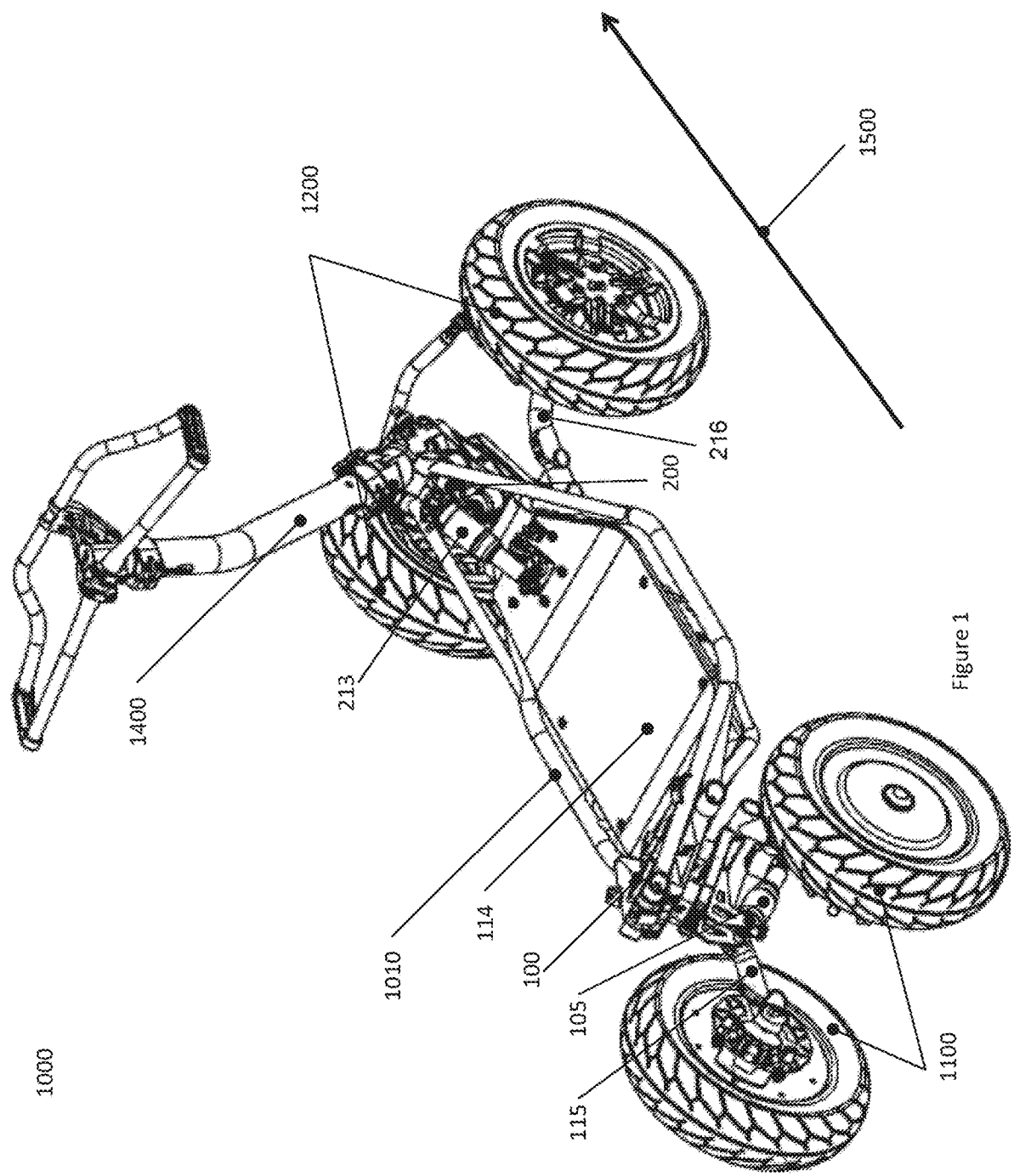
FIG. 1 presents an elevated rearward perspective view of a vehicle with a combined, rear and front steering mechanism, according to some embodiments of the present invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "vehicle" used herein refers to any motorized or non-motorized vehicle known in the art having two or more wheels.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

FIG. 1 presents an isometric top view of the invented vehicle 1000, according to some embodiments. The vehicle's forward direction of travel is marked by the arrow 1500. The vehicle of the present invention includes, but is not limited to at least one of the following:

a base structure or chassis [1010];

a substantially horizontal standing platform [114], incorporated within said chassis [1010], configured for supporting a load such as a driver, and optionally other loads or passengers;

a front wheel set [1200] and a rear wheel set [1100], each set including one or more wheels, and an axle [115, 216] attached to the said one or more wheels;

a front elastic pivot structure [200] associated with the front wheel set [1200];

a front shock absorber [213], associated with the front wheel set [1200];

a rear elastic pivot structure [100] associated with the rear wheel set [1100];

a rear shock absorber [105], associated with the rear wheel set [1100];

a steering set comprising a steering member such as a steering handle bar [1400] movably connectable to the front wheels [1200] via one or more connecting means for steering thereof; and one or more motors, engines or other driving or propulsion means (not shown in FIG. 1).

Figure 2B:
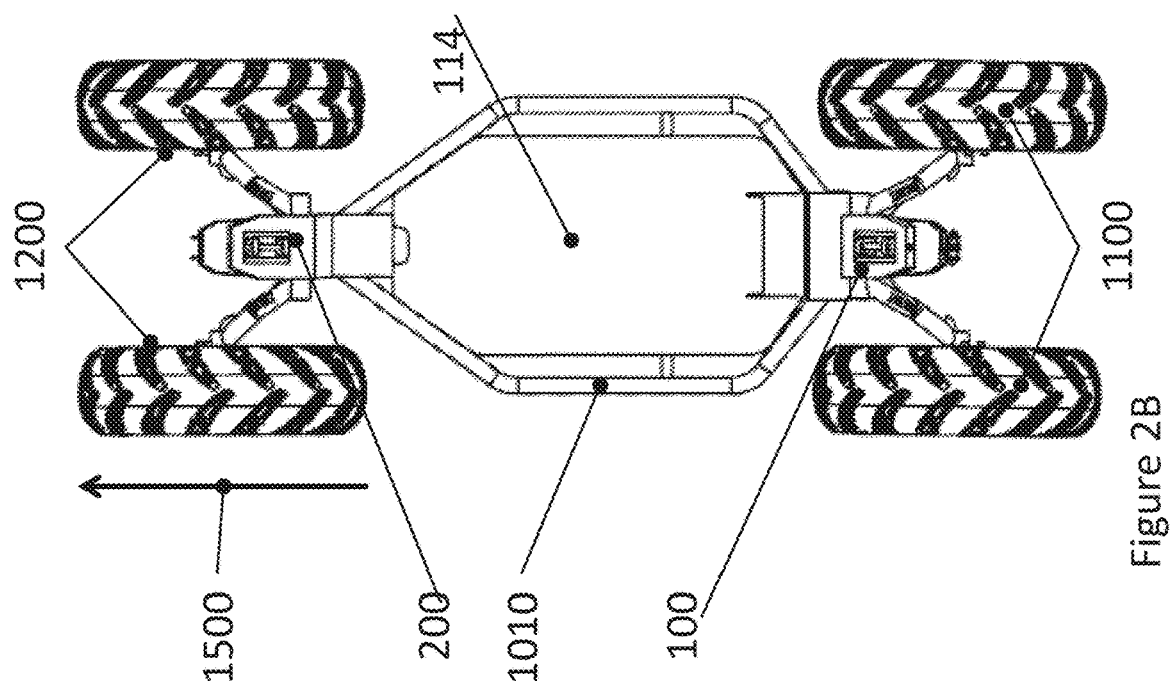
FIGS. 2A and 2B respectively show the vehicle's chassis and wheel sets in a rear and top view, excluding the steering handle bar, when no force is applied to any part of the vehicle, according to some embodiments.
Figure 2A:
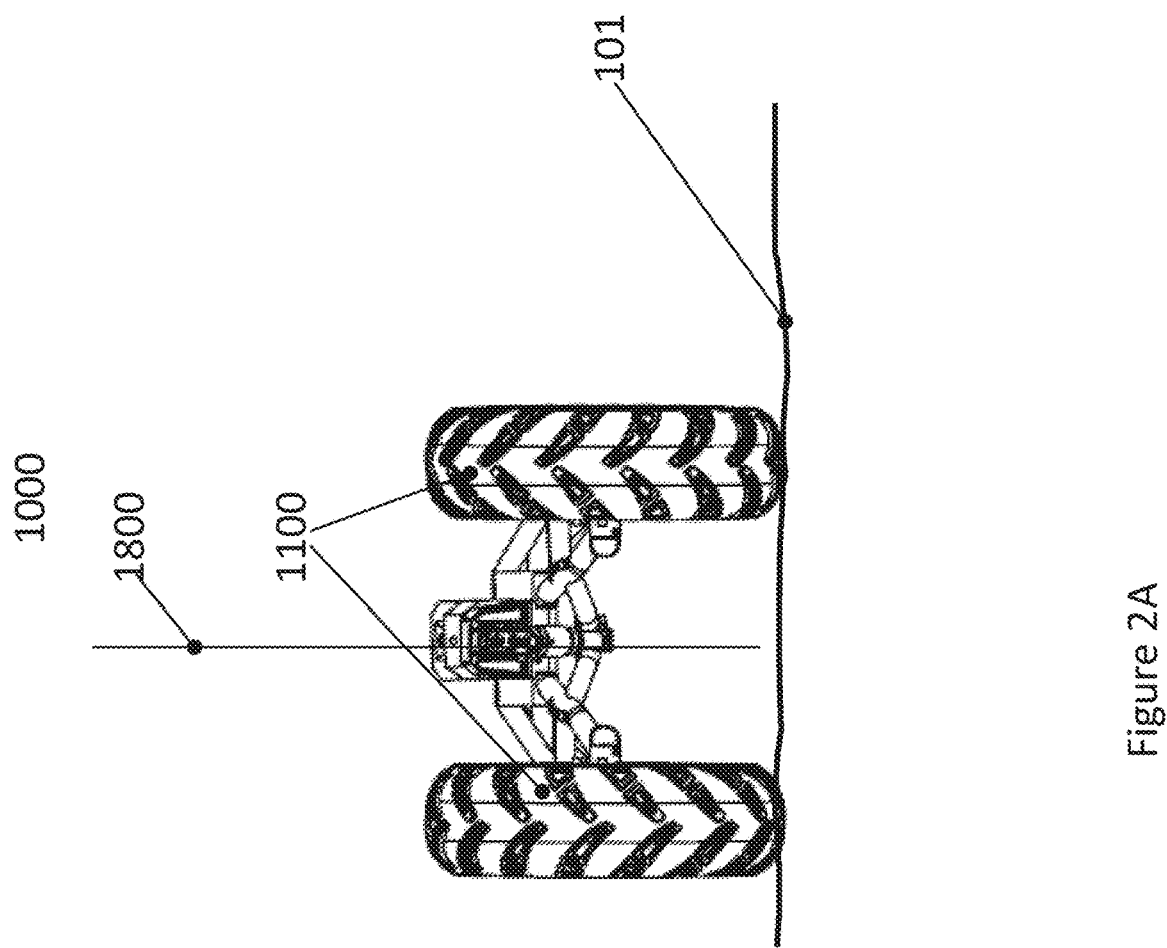

FIGS. 2A and 2B respectively show the vehicle's chassis [1010] and wheel sets [1100,1200] in a rear and top view, excluding the steering handle bar, when no force is applied to any part of the vehicle, according to some embodiments. The vehicle's forward direction of travel is marked by the arrow 1500. In this condition, both the front wheel set [1200] and rear wheel set [1100] are positioned in an orientation parallel to the direction of travel. The chassis [1010] is positioned in an upright condition, substantially parallel to the ground surface [101], and the line [1800] perpendicular to the standing platform [114] is substantially vertical. FIG. 2B also presents the locations of the front elastic pivot structure [200] and the rear elastic pivot structure [100], the functions of which are explained further below.

Figure 3:
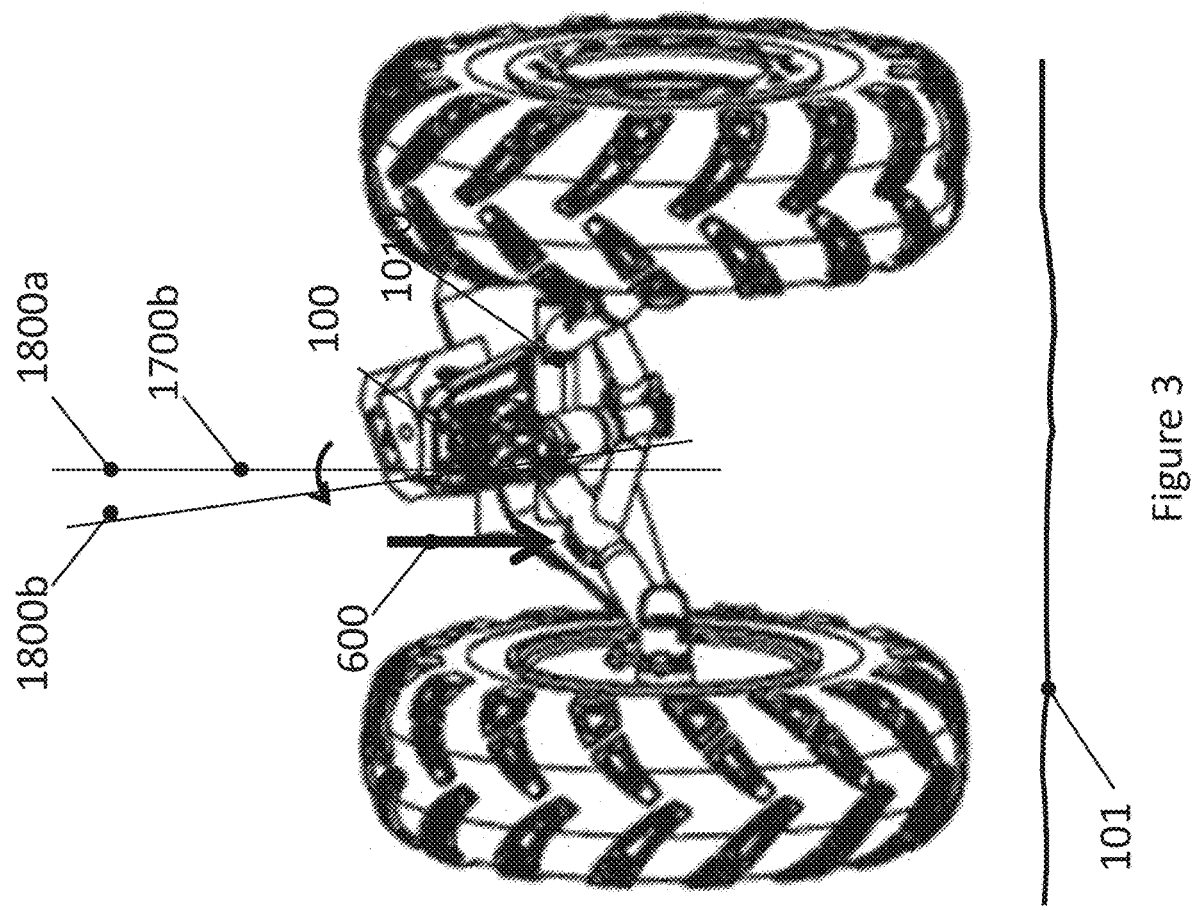
FIG. 3 presents a rear view of the vehicle in a condition at which an uneven vertical force is applied to any part of the chassis (e.g. by applying most of the driver's weight on one side of the standing platform), according to some embodiments.

FIG. 3 presents a rear view of the vehicle in a condition at which an uneven vertical force [600] is applied to any part of the chassis [1010] (e.g. by applying most of the driver's weight on one side of the standing platform [114]), according to some embodiments. The said condition causes the chassis [1010] to tilt in the direction of the said uneven force: the line [1800] which is perpendicular to the vehicle's chassis [1010] is shown to have tilted [1700*b*] from the vertical position [1800*a*] to the tilted position [1800*b*].

Figure 4:
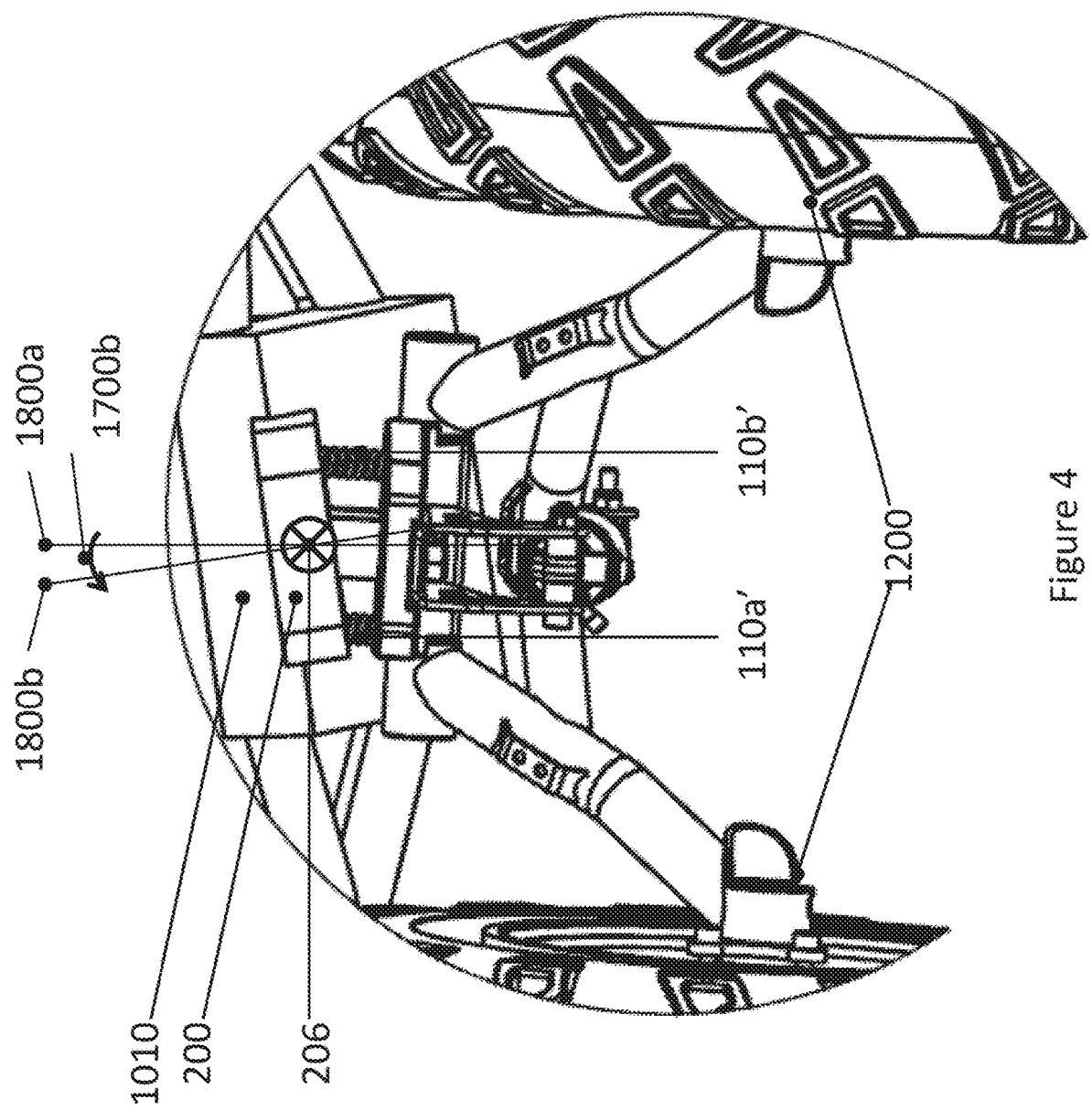
FIG. 4 presents a front elevated view of the front elastic pivot structure in a tilted configuration, according to some embodiments.

FIG. 4 presents a front elevated view of the front elastic pivot structure [200] in a tilted configuration, according to some embodiments. The line [1800*b*] which is normal to the vehicle's chassis [1010] is shown to have tilted by an angle [1700*b*] from the vertical position [1800*a*] along a front roll axis [206].

The front elastic pivot structure [200] comprises a front set of elastic joints. In the embodiment depicted in FIG. 4, the said set of elastic joints comprises two joints [110*a*', 110*b*']. In other embodiments, the said set of elastic joints may include any number of joints (e.g. one joint or more joints).

In the embodiment depicted in FIG. 4, the elastic joints [110*a*', 110*b*'] are implemented as spring joints. In other embodiments, the said elastic joints [110*a*', 110*b*'] are implemented as rubber joints, or pistons or any combination thereof.

The front set of elastic joints [110*a*', 110*b*'] facilitate the tilt movement of the chassis [1010] (and associated platform [114]) as described above in relation to the front wheel set [1200], along the front roll axis [206]. The front roll axis [206] substantially intercepts the geometric location of the front elastic joints [110*a*', 110*b*'].

The tilt movement [1700*b*] of the chassis [1010] and associated standing platform [114] around the front roll axis [206] is obtained by either one of the following mechanisms, or by a combination thereof:

The 1st mechanism for obtaining a tilt movement around the front roll axis [206] is based on applying an uneven vertical force [600] (e.g.: by applying most of the driver's weight to one side of the standing platform [114]), as depicted in FIG. 3. In this example, the uneven vertical force [600] exerts uneven pressure on the elastic joints [110a', 110b'] of the front elastic joints' set, causing them to constrict in an uneven manner and resulting in the said tilt movement [1700b].

The 2nd mechanism for obtaining a tilt movement around the front roll axis [206] is based on applying a lateral, horizontal force to any part of the chassis [1010], and translating the chassis [1010] consequent lateral movement to a tilt motion along the front roll axis [206] by a ball joint [110n]. This mechanism is further explained below, in relation to FIGS. 12a, 12b, 12c.

The tilting [1700b] of the chassis [1010] around the front roll axis [109] is translated by the front elastic pivot structure [200] to a yaw motion of the front wheel set [1200], causing the vehicle to steer in response to the tilt. The said translation of the chassis [1010] tilt to the wheel set's yaw motion is explained further below, in relation to FIG. 16.

Figure 5:
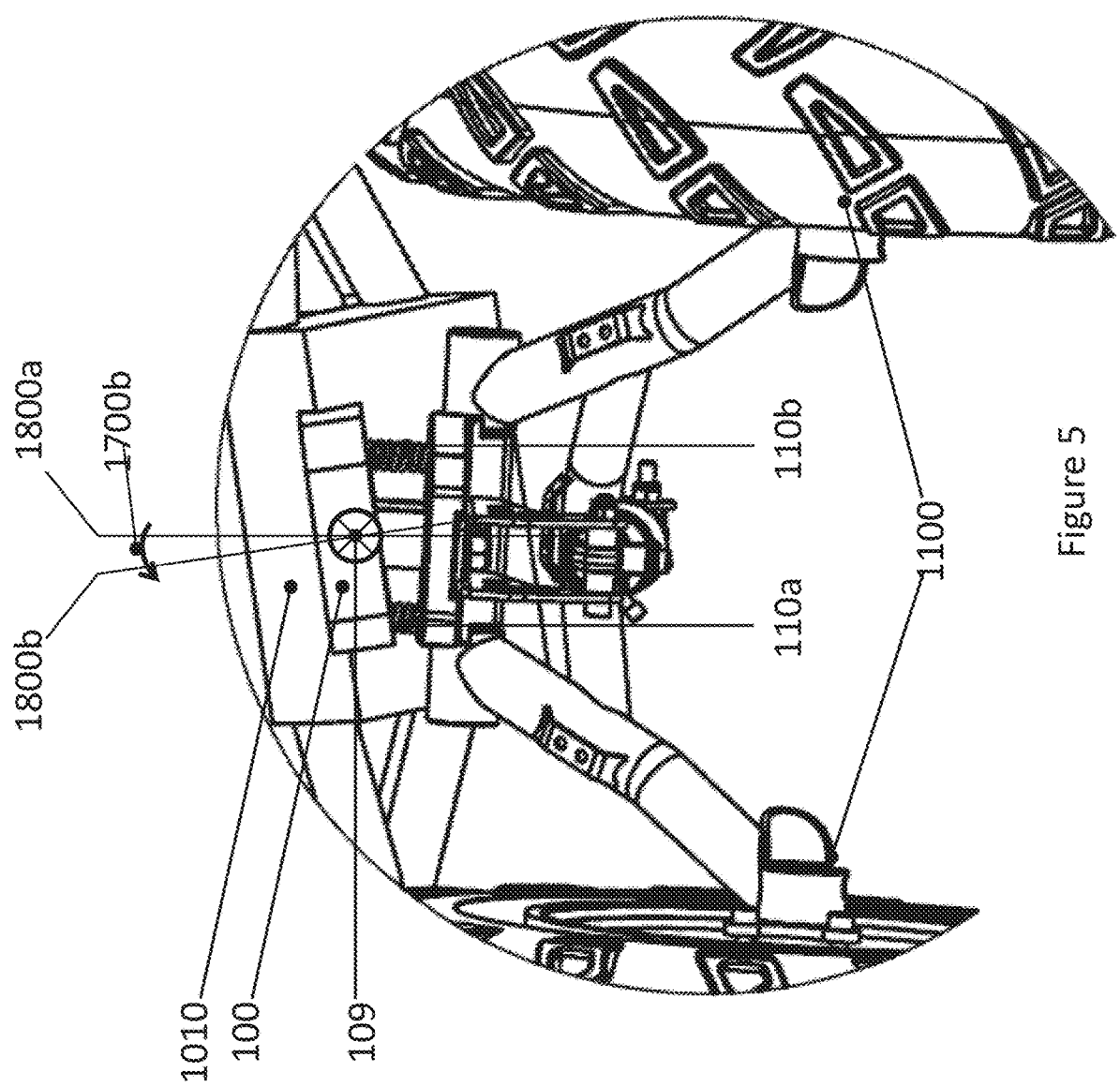
FIG. 5 presents a rear, elevated view of the rear elastic pivot structure in a tilted position, according to some embodiments.

FIG. 5 presents a rear, elevated view of the rear pivot joint structure [100] in a tilted position, according to some embodiments. The line [1800b] which is normal to the vehicle's chassis [1010] is shown to have tilted by an angle [1700b] from the vertical position [1800a] along a rear roll axis [109].

The rear elastic pivot structure [100] comprises a rear set of elastic joints. In the embodiment depicted in FIG. 5, the said set of elastic joints comprises two joints [110a, 110b]. In other embodiments, the said set of elastic joints may include any number of joints (e.g. one joint or more joints).

In the embodiment depicted in FIG. 5, the elastic joints [110a, 110b] are implemented as spring joints. In other embodiments, the said elastic joints [110a, 110b] are implemented as rubber joints or pistons or any combination thereof.

The rear set of elastic joints [110a, 110b] facilitate a tilt movement of the chassis [1010] (and associated platform [114]) in relation to the rear wheel set [1100], along the rear roll axis [109]. The rear roll axis [109] substantially intercepts the geometric location of the rear elastic joints [110a, 110b].

The tilt movement [1700b] of the chassis [1010] and associated standing platform [114] around the rear roll axis [109] is obtained by either one of the following mechanisms, or by a combination thereof:

The 1st mechanism for obtaining tilt around the rear roll axis [109] is based on applying an uneven vertical force [600] to any part of the chassis [1010] (e.g. by applying most of the driver's weight to one side of the standing platform [114]). The said uneven vertical force [600] exerts uneven pressure on the elastic joints [110a, 110b] of the rear elastic pivot structure [100]. The elastic joints are constricted in an uneven manner, resulting in the said tilting motion 1700b.

The 2nd mechanism for obtaining a tilt movement around the rear roll axis [109] is based on applying a lateral, horizontal force to any part of the chassis [1000], and translating the chassis [1010] consequent lateral movement to a tilt motion along the rear roll axis [109] by a ball joint. This mechanism is further explained below, in relation to FIG. 12(a,b,c).

The 3rd mechanism for obtaining a tilt movement around the rear roll axis [109] is also based on applying a lateral, horizontal force to any part of the chassis [1010]. A force moment comprised of the said lateral force, and the ground's reactive force produces a yaw motion of the rear wheel set, as well as a tilt of the chassis [1010]. The function of this mechanism is explained in detail in relation to FIG. 14.

The tilting [1700b] of the chassis [1010] around the rear roll axis [109] is translated by the rear elastic pivot structure [100] to a yaw motion of the rear wheel set, causing the vehicle to steer in the direction of the tilt. The said translation of the chassis [1010] tilt to the wheel's yaw motion is explained further below, in relation to FIG. 14.

Figure 6:
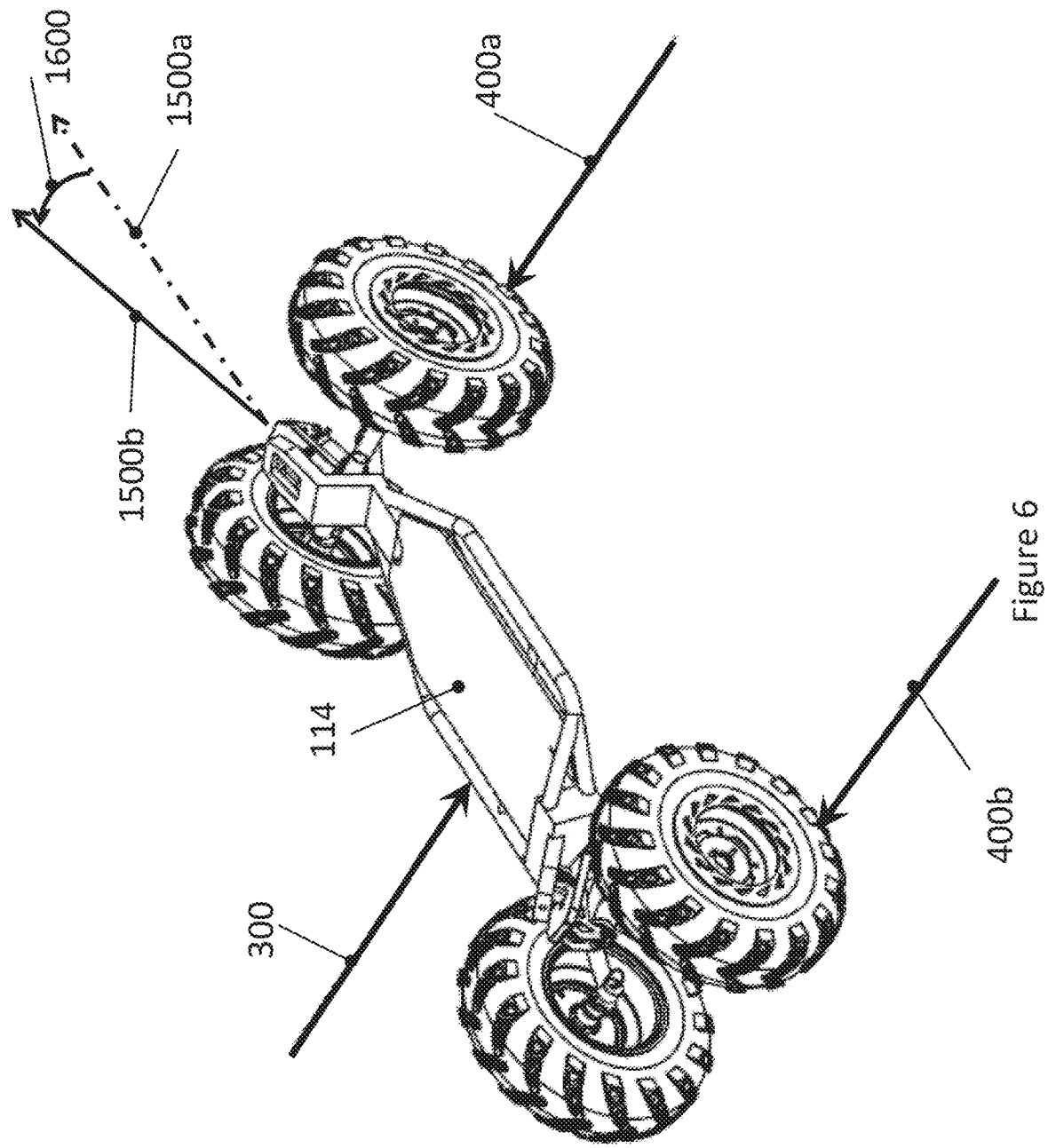
FIGS. 6 and 7 respectively show an elevated isometric view and a top view of the vehicle chassis and wheels, during the application of a lateral, horizontal force to the chassis and the associated standing platform according to some embodiments.
Figure 7:
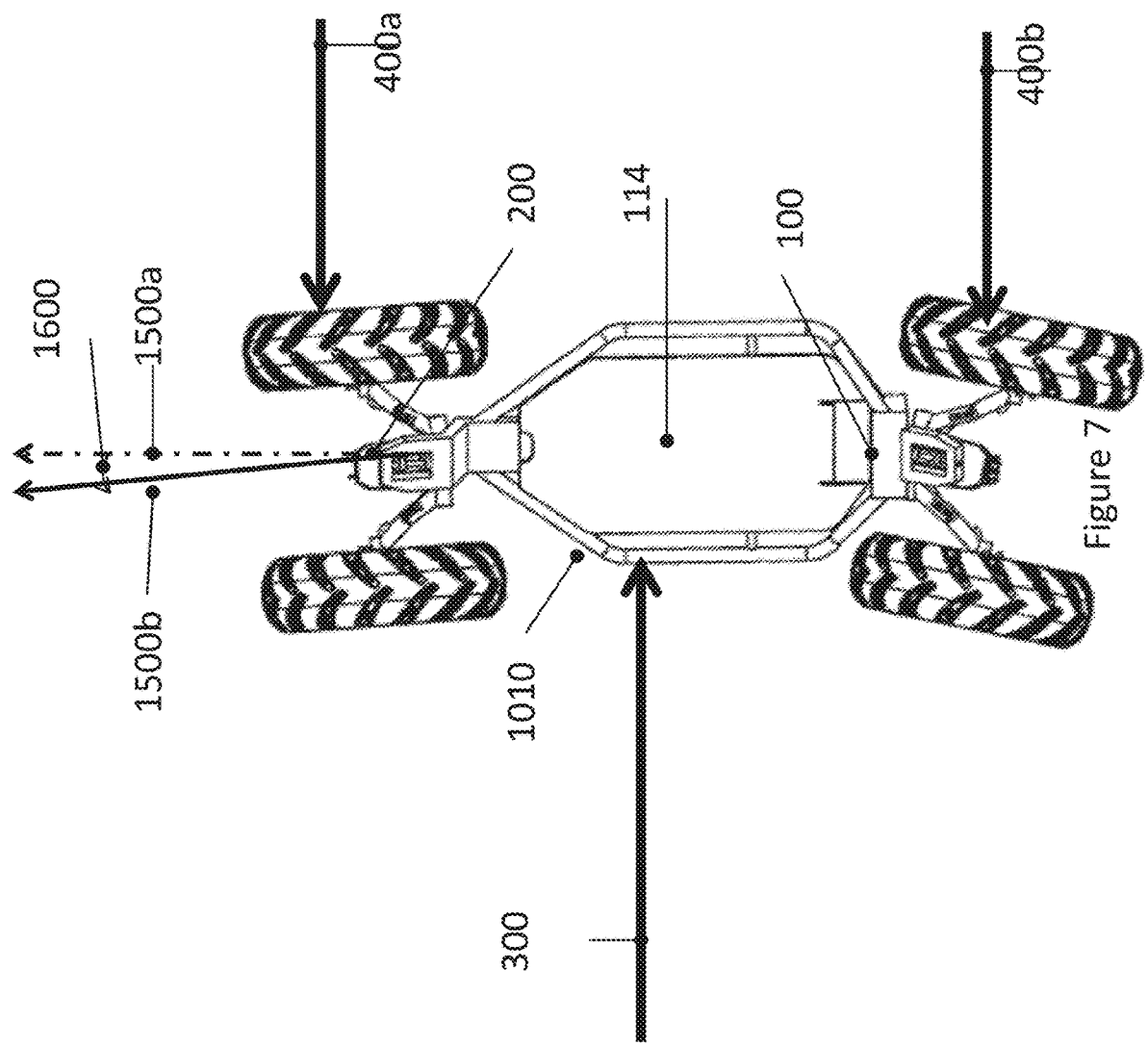

FIGS. 6 and 7 respectively show an elevated isometric view and a top view of the vehicle chassis [1010] and wheels, during the application of a lateral, horizontal force [300] to the chassis [1010] (and the associated standing platform [114]) according to some embodiments. The said lateral force [300] may be applied in various conditions, including for example:
 shifting the driver's weight laterally to one side of the standing platform [114], as in a surfing motion;
 directly applying a lateral horizontal vector of force to any part of the vehicle's chassis [1010]; and
 steering the vehicle in a curved route by using the steering handle bar [1400], thus generating a lateral centrifugal force.

The application of the said lateral force [300] creates reactive friction forces [400a] and [400b], originating from the ground and applied to the front [1200] and rear [1100] wheel sets respectively. The action line of the ground's reactive force [400b] passes through the wheel's point of contact with the ground.

The combination of force vectors [300] and [400a] creates a force moment on the front wheel set [1200]. The combination of force vectors [300] and [400b] creates a force moment on the rear wheel set [1100]. The said force moments cause the front and rear wheel sets to yaw. This yaw movement steers the vehicle against the direction of the applied horizontal lateral force [300], and changes the direction of the vehicle travel from [1500a] to [1500b]. The said yaw movement provides the following benefits to the invented vehicle:
 The driver may enhance the steering of the vehicle through lateral shifting of his/her weight, in a similar manner to a surfing motion; and
 The vehicle produces enhanced steering when turning in sharp curves.

Figure 8:
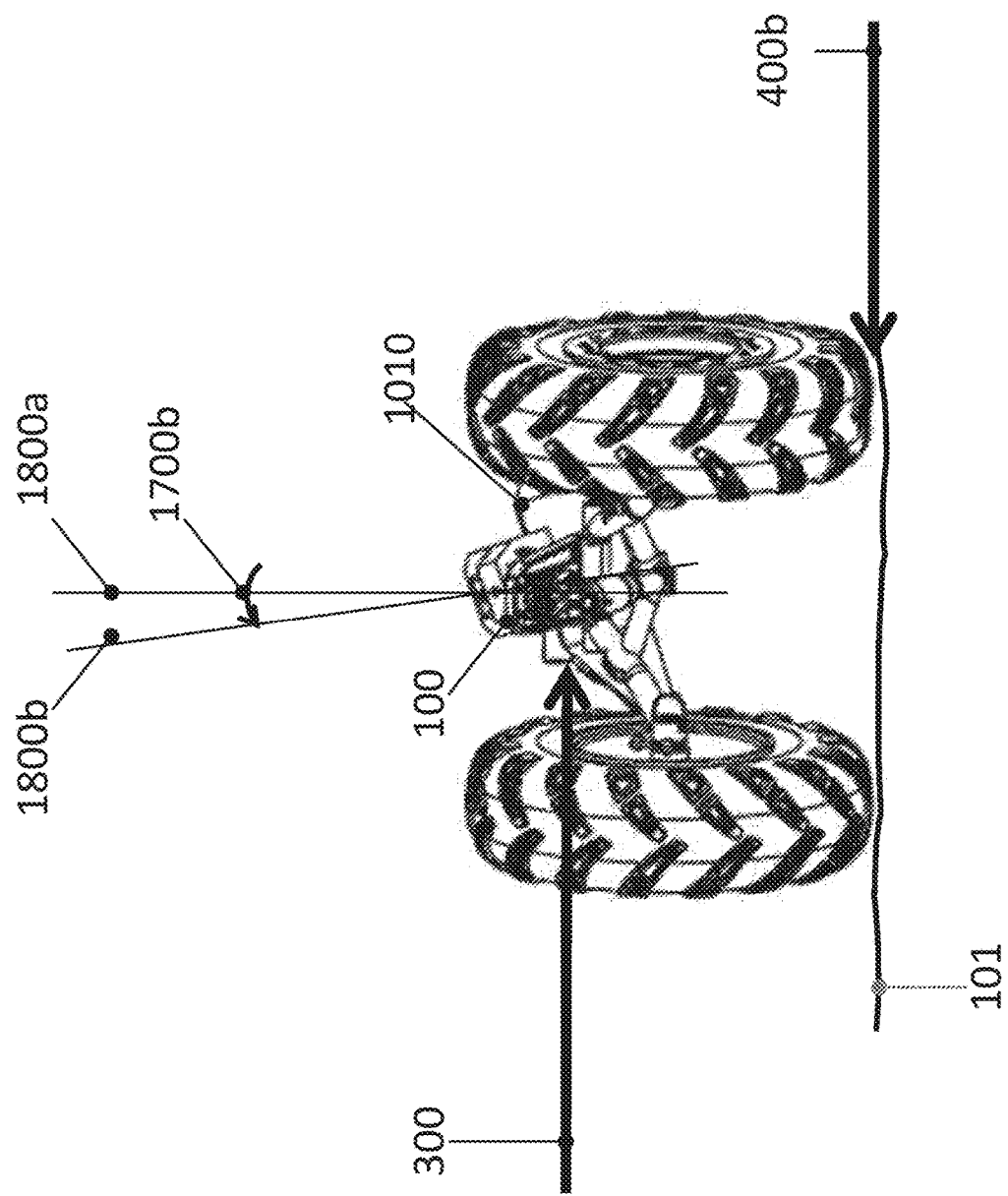
FIG. 8 presents a rear view of the vehicle chassis and wheels, during the application of a lateral, horizontal force to the chassis, according to some embodiments of the present invention.

FIG. 8 presents a rear view of the vehicle chassis [1010] and wheels, during the application of a lateral, horizontal force [300] to the chassis [1010], according to some embodiments of the present invention. Note that the application of the said horizontal force [300] causes the chassis [1010] to tilt [1700b].

The rear elastic pivot structure [100] and front elastic pivot structure [200] react to the application of a horizontal, lateral force [300] and to the ground's reactive forces [400b, 400a] by tilting the chassis [1010], along the rear roll axis [109] and front role axis [206] respectively. The mechanisms by which the elastic pivot structures do so are explained further below.

Figure 9:
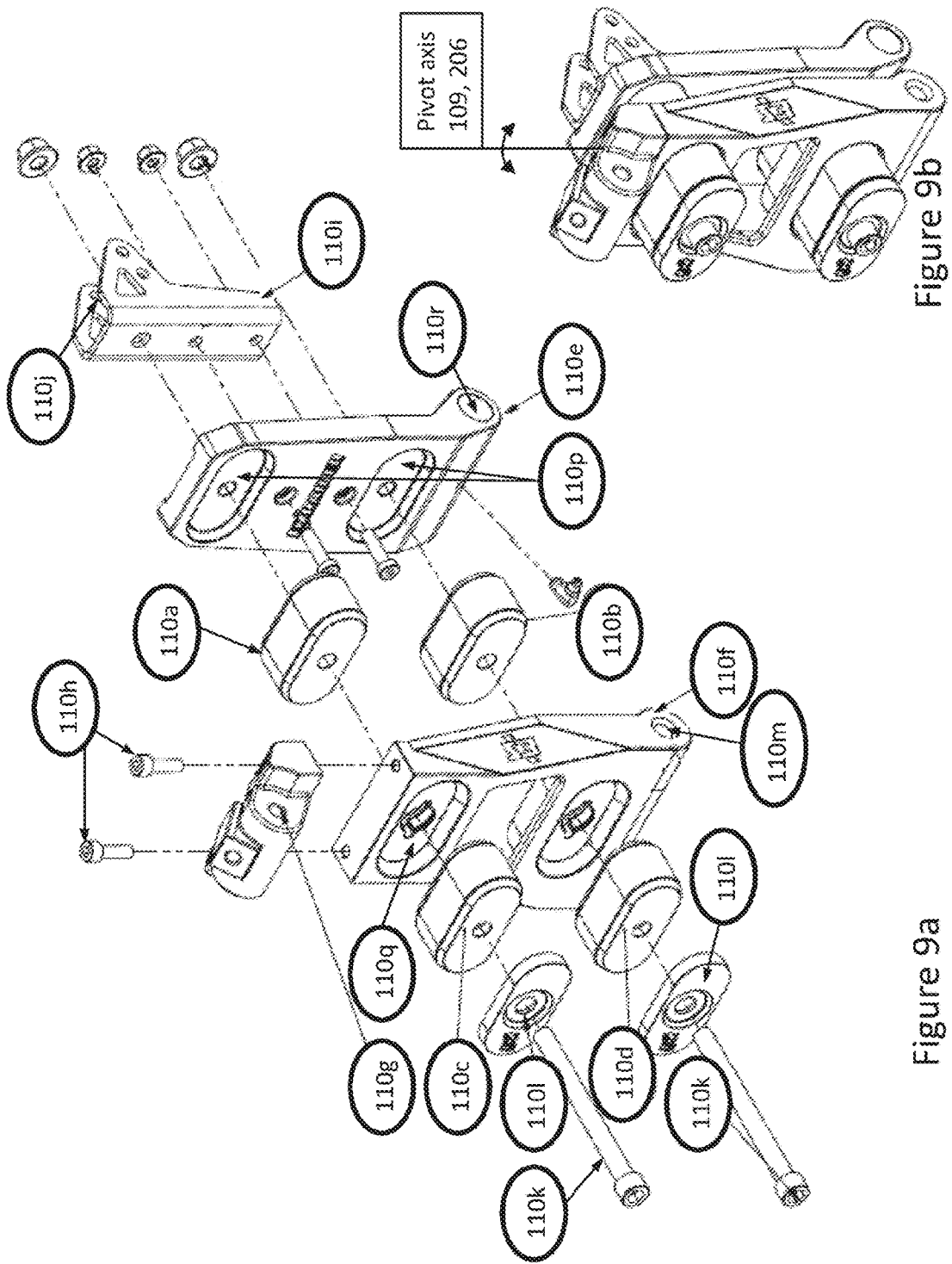
FIGS. 9a and 9b respectively present blown, and assembled isometric views of the elastic pivot structure, according to some embodiments of the present invention.

FIGS. 9a and 9b respectively present blown, and assembled isometric views of the elastic pivot structures [100, 200], according to some embodiments of the present invention. The structure of the front elastic pivot structure [200] is identical to that of the rear elastic pivot structure [100], and they will not be elaborated separately for the purpose of brevity.

The numbering of the front pivot structure [200] members is marked by a tag, i.e.: 110X annotates a member of the rear elastic pivot structure [100], whereas 110X' annotates a member of the front elastic pivot structure [200].

According to some embodiments, the elastic pivot structure [100, 200] comprises an upper suspension plate [110f], and a middle suspension plate [110e]. Said plates [110f, 110e] are attached via one or more elastic joints [110a, 110b]. This structure enables the plates [110f', 110e'] of the front elastic pivot structure [200] to tilt in respect to each other along the front roll axis [206], and enables the plates [110f, 110e] of the rear elastic pivot structure [100] to tilt in respect to each other along the rear roll axis [109] (see FIGS. 4,5). This facilitates a tilt of the chassis [1010] in respect to the front wheel set [1200] along the front roll axis [206], and a tilt of the chassis [1010] in respect to the rear wheel set [1100] along the rear roll axis [206].

The elastic joints [110a', 110b', 110c', 110d'] facilitate the tilt of the chassis [1010] in respect to the front wheel set [1200] along the front roll axis [206], as explained in relation to FIG. 4.

The elastic joints [110a, 110b, 110c, 110d] facilitate the tilt of the chassis [1010] in respect to the rear wheel set [1100] along the rear roll axis [109], as explained in relation to FIG. 5.

According to the embodiment depicted in FIGS. 9a and 9b, the middle suspension plate [110e] incorporates housings [110p], configured to hold a set of two elastic rubber joints [110a, 110b]. The said set of rubber joints [110a, 110b] is secured between the middle suspension plate [110e] and the upper suspension plate [110f] by a set of bolts [110k].

According to other embodiments (e.g. as depicted in FIG. 5), the said elastic joints [110a, 110b] are implemented as springs or pistons or any combination thereof.

According to the embodiment depicted in FIG. 9a, the upper suspension plate [110f] comprises additional housings [110q], holding a second set of elastic rubber joints [110c, 110d]. The said second set of elastic rubber joints [110c, 110d] is secured above the upper suspension plate [110f] by the same set of bolts [110k], between the upper suspension plate [110f] and a set of tighteners [110l].

According to other embodiments (e.g. as depicted in FIG. 5) the said second set of elastic rubber joints [110c, 110d] is not installed.

The chassis [1010] is attached to the upper suspension plate [110f] of the elastic pivot structure [100, 200]. According to the embodiment depicted in FIG. 9a, the chassis [1010] is attached to the upper suspension plate [110f] in at least two positions:
  through a bolt in position [110m] of the upper suspension plate [110f]; and
  through a bolt in position [110g] of a connector module, which is connected to the upper suspension plate [110f] by an additional set of bolts [110h].

According to other embodiments, the chassis [1010] incorporates the upper suspension plate [110f], and is directly attached to the said elastic joints [110a, 110b, 110c, 110d].

According to the embodiment depicted in FIG. 9a, the middle suspension plate [110e] is connected to the rear wheel set [1100] and rear shock absorber [105] as follows:
  the rear axle [115] (not shown) is connected to the middle suspension plate [110e] through a bolt in position [110r];
  a lower suspension connector [110i] is connected to the middle suspension plate [110e] on its upper side; and
  said lower suspension connector [110i] is connected to the rear shock absorber (not shown) by a set of bolts in position [110j] on its bottom side.

According to other embodiments, the middle suspension plate [110e] is connected to the rear wheel set [1100] and rear shock absorber [105] directly, i.e. not via a lower suspension connector [110i].

According to the embodiment depicted in FIG. 9a, the middle suspension plate [110e'] is connected to the front wheel set [1200] and front shock absorber [213] as follows:
  the front axle [216] (not shown) is connected to the middle suspension plate [110e'] through a bolt in position [110r'];
  a lower suspension connector [110i'] is connected to the middle suspension plate [110e'] on its upper side; and
  said lower suspension connector [110i'] is connected to the front shock absorber (not shown) by a set of bolts in position [110j'] on its bottom side.

According to other embodiments, the middle suspension plate [110e'] is connected to the front wheel set [1200] and front shock absorber [213] directly, i.e. not via a lower suspension connector [110i'].

According to some embodiments, the elastic joints [110a, 110b, 110c, 110d, 110a', 110b', 110c', 110d'] are configured to be replaceable, and are configured to exhibit various levels of elasticity. These features of the elastic joints facilitate the ability to modify the vehicle's compliance to the tilt motion in response to the application of vertical and horizontal forces, and customize the vehicle according to the requirements of specific drivers. For example:
  Rigid elastic joints [110a, 110b, 110c, 110d, 110a', 110b', 110c', 110d'] will be less compliant to the tilting motion, and will induce a moderate riding experience, characteristic of conservative drivers.
  Softer elastic joints [110a, 110b, 110c, 110d, 110a', 110b', 110c', 110d'] will be more compliant to the tilting motion, and will induce an extreme riding experience, characteristic of sportive drivers.

As mentioned above, one of the mechanisms for tilting the chassis [1010] around the rear and front roll axes [109, 206] is based on applying a lateral force in a horizontal vector [300] to any part of the chassis [1010], and translating the chassis [1010] lateral movement to a tilt movement along the rear and/or front roll axis [109, 206] by a ball joint.

Figure 10:
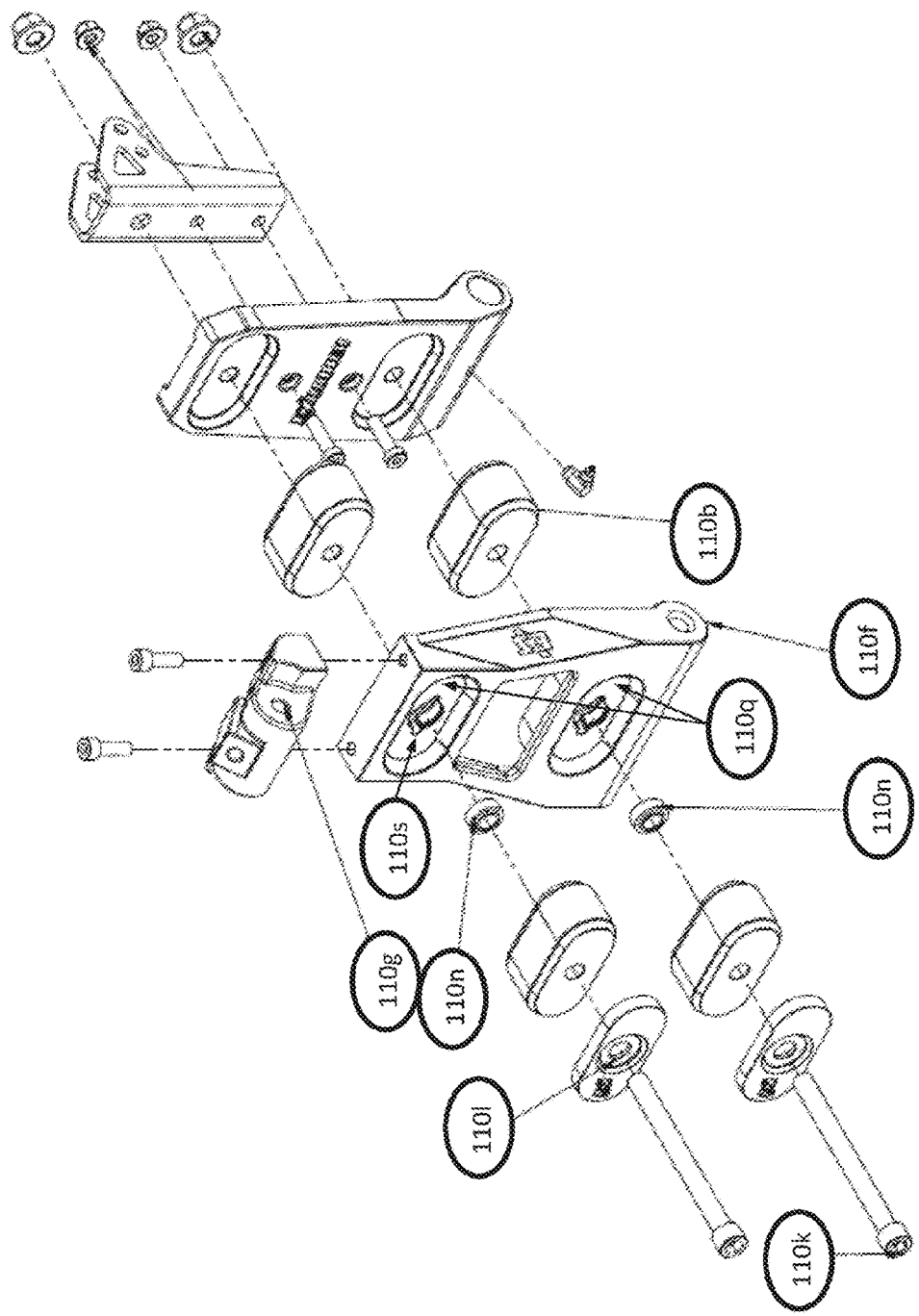
FIG. 10 presents an exploded perspective view of the elastic pivot structure according to some embodiments of the present invention.

Reference is now made to FIG. 10, presenting an exploded perspective view of the elastic pivot structure [100, 200] according to another embodiment of the present invention. This figure is substantially equivalent to that of FIG. 9a, with the addition of a pair of ball joint connectors [110n], attached to the upper suspension plate [110f] within the housing [110q], and securing the bolts [110k] into place.

According to some embodiments, the said housings [110q] of the upper suspension plate [110f] comprise a grooved opening [110s], enabling the bolt [110k] to move laterally in respect to the upper suspension plate [110f].

Figure 11A:
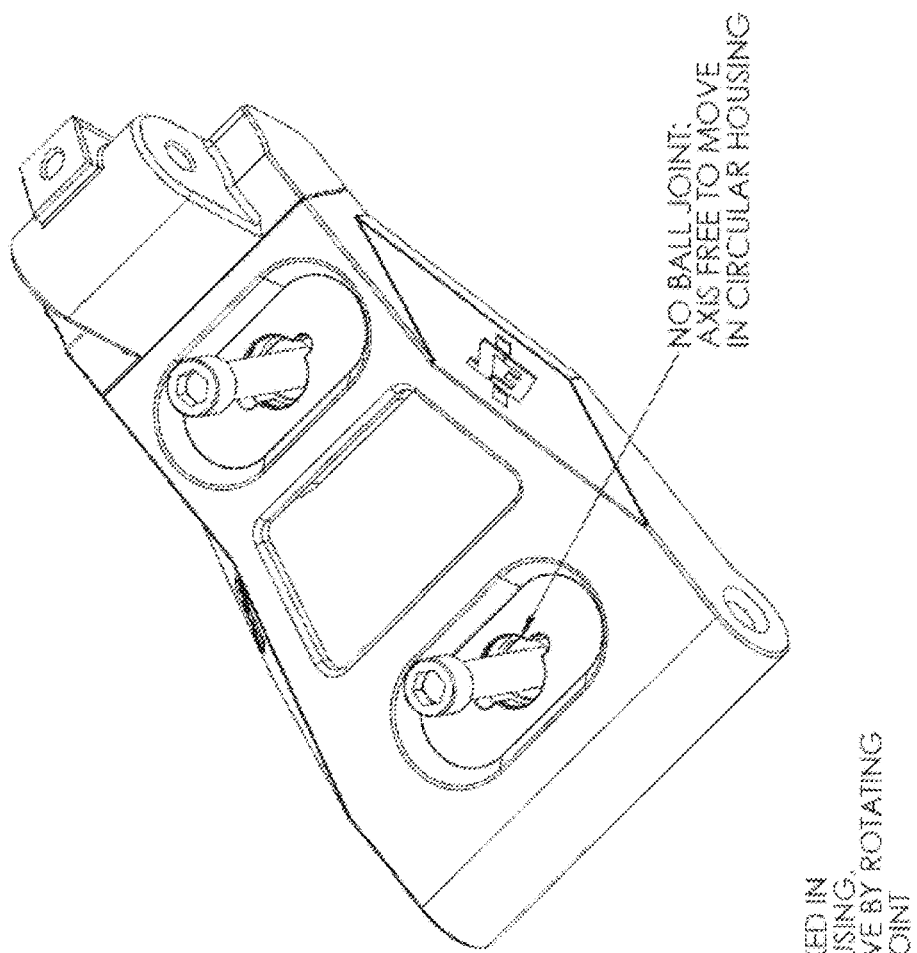
FIGS. 11a and 11b present an assembled isometric view of the elastic pivot structure, with and without the installation of the ball joint connector respectively, according to some embodiments
Figure 11B:
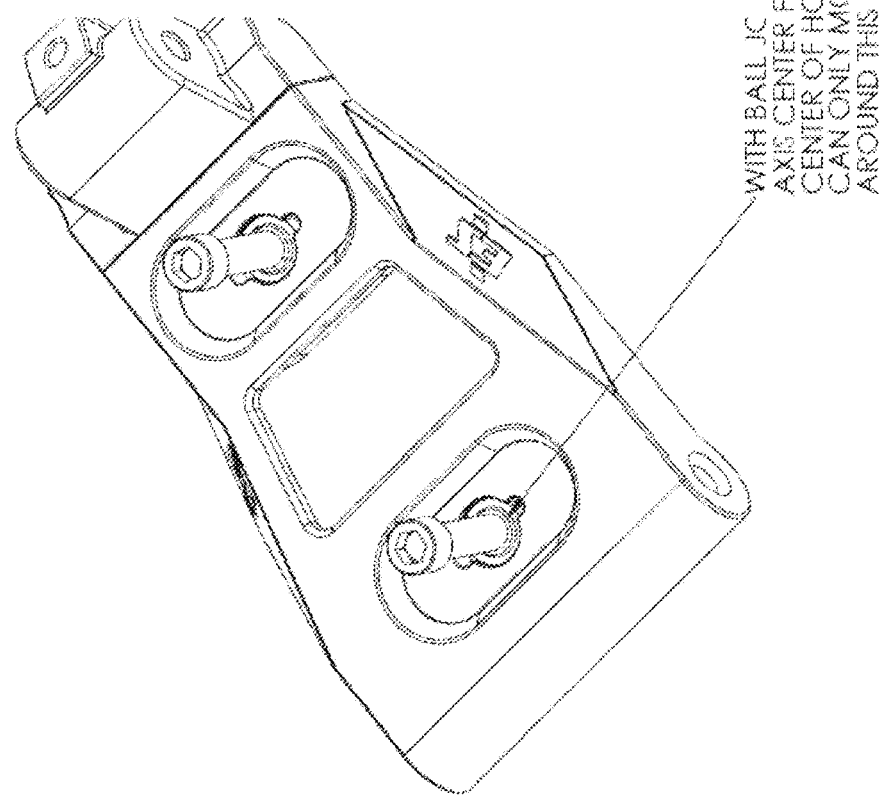

FIGS. 11a and 11b present an assembled isometric view of the elastic pivot structure [100, 200], with and without the installation of the ball joint connector [110n] respectively, according to some embodiments.

In FIG. 11b, the bolt [110k] is free to move along the grooved opening [110s] within the elastic joint's [14] oval housing [110q]. This enables the upper suspension plate [110f] to move laterally in respect to the middle suspension plate [110e], and hence enables the chassis [1010] to move laterally in respect to the rear wheel set [1100].

In FIG. 11a, the ball joint's axis is fixed in the center of the elastic joint's housing [110q] by the ball joint [110n].

Consequently, the bolt [110k] can only move by rotating around that point. This limitation translates a lateral movement of the upper suspension plate [110f] to a tilt movement in respect to the middle suspension plate [110e].

On the front end of the vehicle, the said translation of a lateral movement of the upper suspension plate [110f'] to a tilt movement in respect to the middle suspension plate [110e'], results in a tilt of the chassis [1010] in respect to the front wheel set [1200] along the front roll axis [206]. In turn, this tilt intensifies the vehicle's front wheel steering in response to an applied lateral, horizontal force [300], as explained further below.

On the rear end of the vehicle, the said translation of a lateral movement of the upper suspension plate [110f] to a tilt movement in respect to the middle suspension plate [110e], results in a tilt of the chassis [1010] in respect to the rear wheel set [1100] along the rear roll axis [109]. In turn, this tilt intensifies the vehicle's rear wheel steering in response to an applied lateral, horizontal force [300], as explained further below.

According to some embodiments, the front elastic pivot structure [200] may be configured to have both ball joints [110n'] installed, or only one ball joint [110n'] installed, or none of the ball joints [110n'] installed, according to the required riding experience, wherein each added ball joint [110n'] intensifies the vehicle's front wheel steering in response to an applied lateral, horizontal force [300].

According to some embodiments, the rear elastic pivot structure [100] may be configured to have both ball joints [110n] installed, or only one ball joint [110n] installed, or none of the ball joints [110n] installed, according to the required riding experience, wherein each added ball joint [110n] intensifies the vehicle's rear wheel steering in response to an applied lateral, horizontal force [300].

Figures 12A, 12B, 12C:
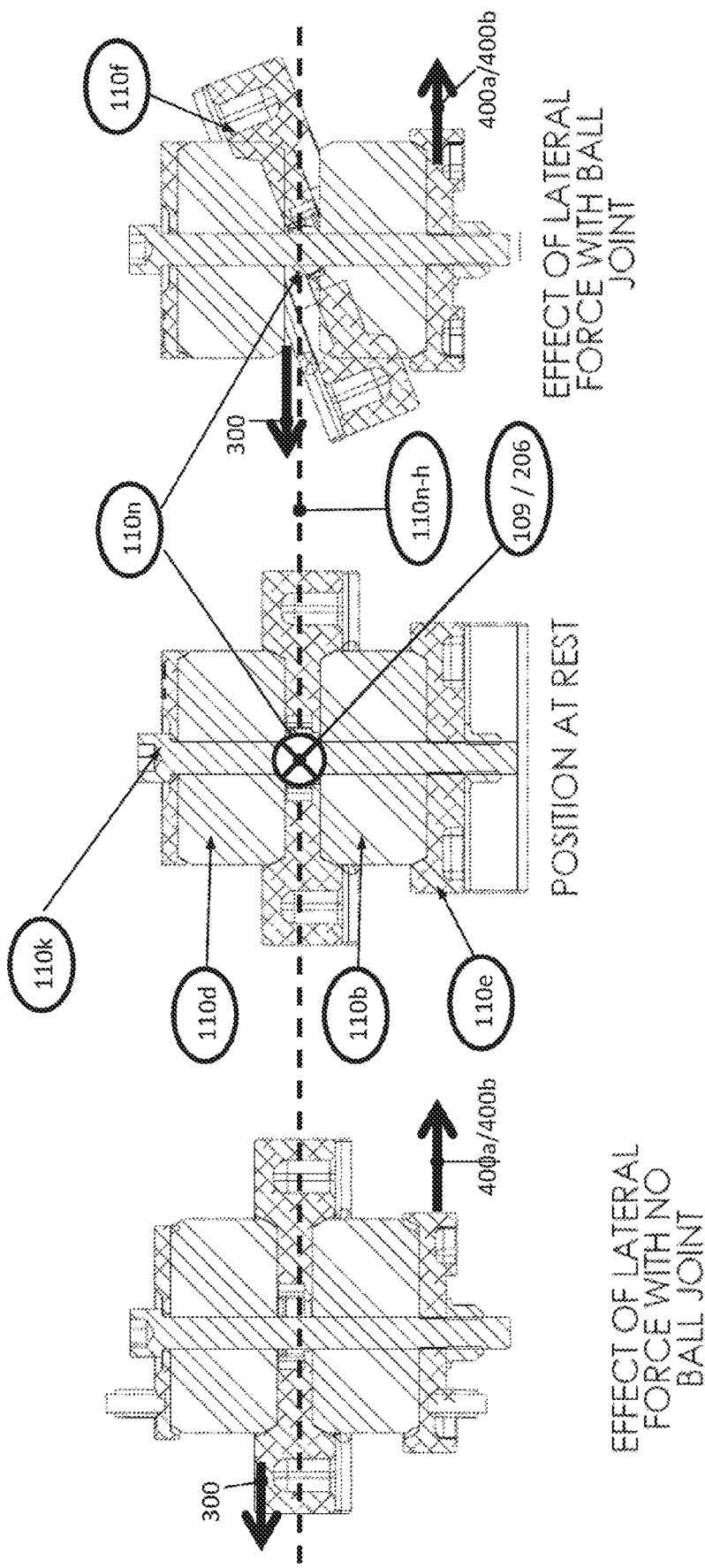
FIGS. 12a, 12b and 12c present a cross-section view of the upper suspension plate and associated members of the elastic pivot structure according to some embodiments of the present invention.

FIGS. 12a, 12b and 12c present a cross-section view of the upper suspension plate [110f] and associated members of the pivot structure [100, 200] according to some embodiments of the present invention. Note that the numbering in the following description relates to the rear elastic pivot structure [100] for the purpose of brevity, but this should not be considered limiting, as the disclosed mechanism is substantially identical in regards to the operation of the front elastic pivot structure [200].

In FIGS. 12a and 12c a lateral, horizontal force [300] is exerted via the chassis [1010] to the upper suspension plate [110f]. The ground exerts a reactive force [400a/400b] on the middle suspension plate [110e] via the rear wheels in response to the said horizontal force vector [300].

FIG. 12b presents the position of the upper suspension plate [110f] with the ball joint [110n] assembled, when no forces are applied.

FIG. 12a presents the effect of the said combined lateral horizontal force [300] and ground reactive force [400a/400b], in the absence of the ball joint [110n]. The upper suspension plate [110f] is shown to have shifted to the left in relation to the middle suspension plate [110e] in response to the combination of forces [300] and [400a/400b].

FIG. 12c presents the effect of the combined lateral horizontal force [300] and ground reactive force [400a/400b], when the ball joint is assembled. The upper suspension plate [110f] is shown to have tilted around the position of the ball joint [110n] in relation to the middle suspension plate [110e], in response to the combination of said forces [300] and [400a/400b].

The action line of force vector 300 is substantially parallel to, and above the horizontal level of the ball joint's position [110n-h]. The action line of force vector [400a/400b] is substantially parallel to, and below the horizontal level of the ball joint's position [110n-h]. In the absence of the ball joint, as presented in FIG. 12a, the bolt [110k] is free to slide horizontally along the elongated oval groove [100s] in response to the said combination of horizontal lateral force [300] and reactive force [400a/400b]. When the ball joint is assembled, as presented in FIG. 12c, the combination of the horizontal force [300] and the ground's reactive force [400a/400b] exerts a force moment on the upper suspension plate [110f] via the ball joint [110n]. This moment forces the ball joint [110n] to translate the upper suspension plate's [110f] horizontal movement to a tilt motion along the roll axis [109/206]. The chassis [1010] (not shown here), which is connected to the upper suspension plate [110f] through bolt [110m] and bolt [110g] (see FIG. 9a) will exhibit the same tilt motion along the roll axis [109/206].

Figure 13:
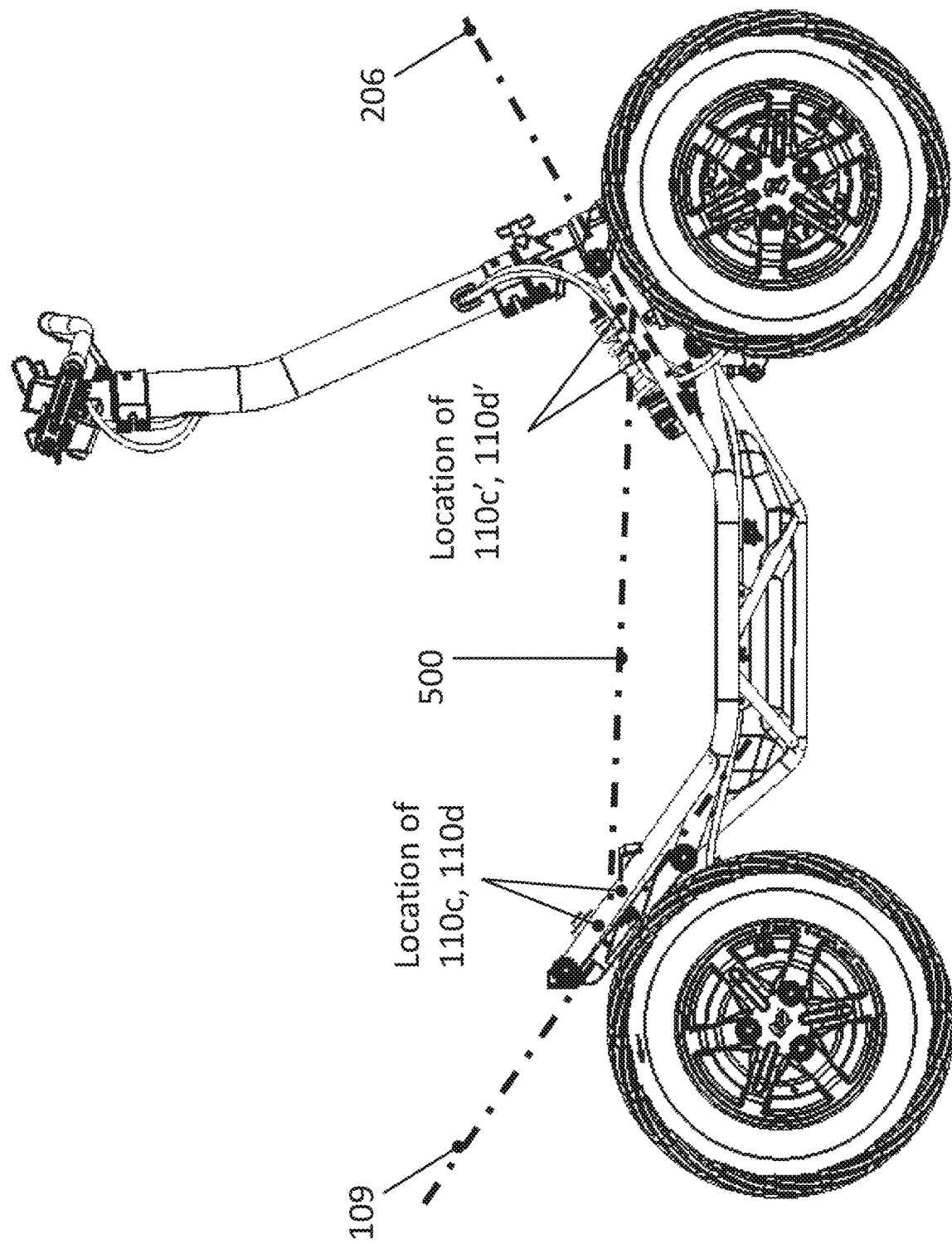
FIG. 13 presents a lateral view of the invented vehicle, depicting the location of the front roll axis and the rear roll axis, according to some embodiments of the present invention.

FIG. 13, presents a lateral view of the invented vehicle, depicting the location of the front roll axis [206] and the rear roll axis [109], according to some embodiments of the present invention. When the chassis [1010] is tilted by any of the mechanisms described above (e.g. by applying a vertical force on the standing platform [114], or by applying a lateral, horizontal force that is translated to a tilt movement), it exhibits an equivalent tilt movement along the front roll axis [206] and along the rear roll axis [109].

The combined roll movement of the chassis around said front and rear roll axes forms a swing movement, along a swing axis [500]. Said swing axis is formed by the imaginary line connecting the front pivot structure [200] and rear elastic pivot structure [100], and is substantially horizontal.

The invented vehicle displays enhanced rear and front wheel steering capabilities, originating from its inherently instable characteristics. For example:

Tilting the standing platform [114], by applying an uneven vertical force on the standing platform [114] produces a yaw of the front wheel set [1200] and the rear wheel set [1100], as explained below in relation to FIGS. 14 and 16;

The said yaw steers the vehicle in response to the applied vertical force; and

The centrifugal, lateral force induced by the said steering is translated by the ball joints [110n, 110n'] located within the elastic pivot structures [100, 200] to additional tilt motion, further amplifying the initial tilt.

The present invention makes use of a pendulum effect to enhance the vehicle's dynamic stability during steering. The said pendulum operates in the following manner:

The swing axis [500] is elevated in respect to the standing platform [114], which normally carries the weight of at least one driver.

When the vehicle is in a neutral state (i.e. the driver is standing upright, and the vehicle is directed forward), the weight exerted on the standing platform [114] acts as a pendulum, swinging around the swing axis [500].

After steering the vehicle in a curved route, the driver may make use of the said pendulum effect to restore the standing platform [114] to an upright position, as portrayed in FIG. 2A. This enables the driver to swiftly bring the vehicle back to a state of dynamic stability, following sharp turn maneuvers.

Figure 14:
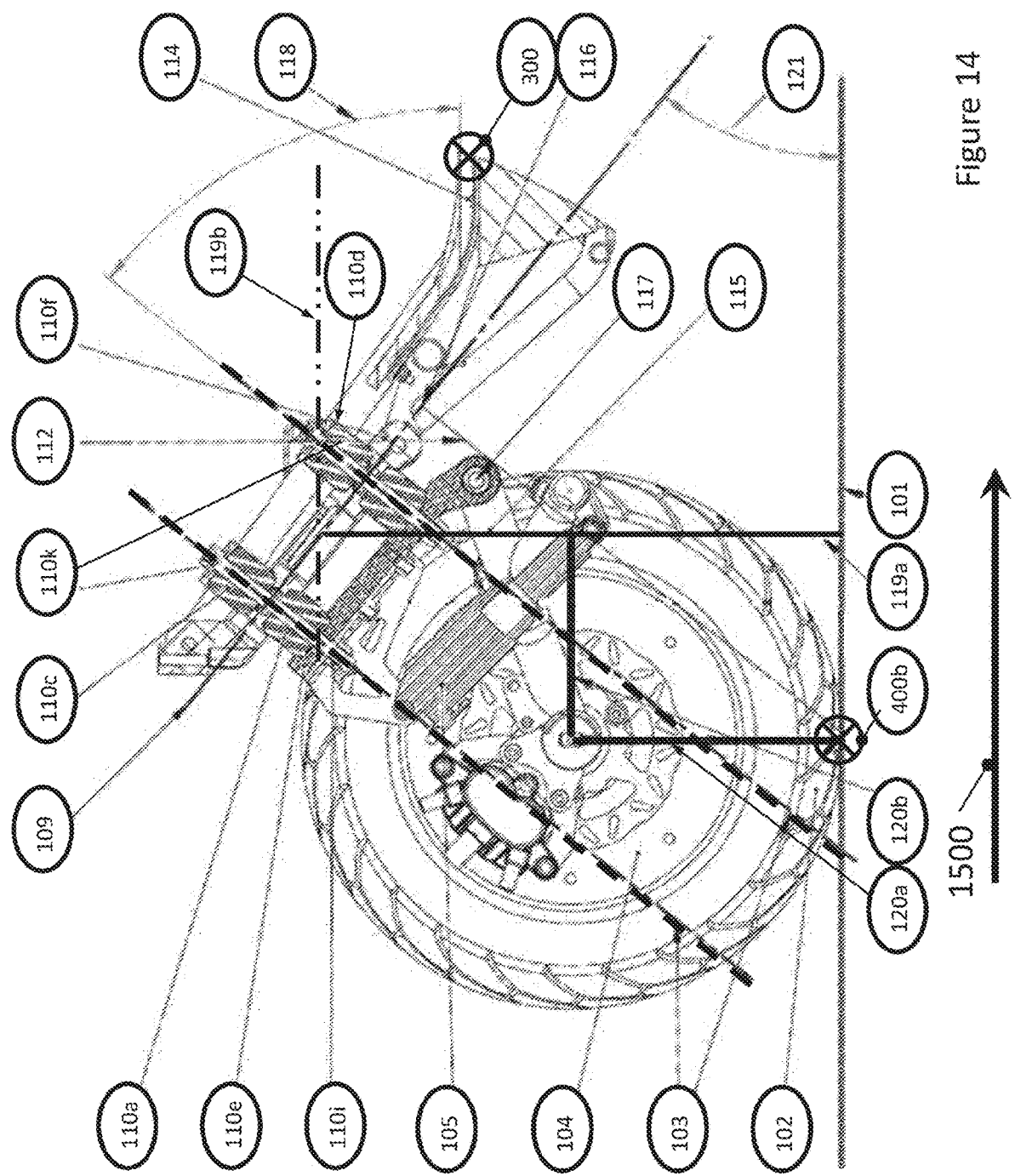
FIG. 14 presents a detailed lateral section view of the rear end of the vehicle according to some embodiments.

FIG. 14 presents a detailed lateral section view of the rear end of the vehicle according to some embodiments. In this figure, the proximal wheel parts have been removed to provide a clear view of the structure.

The present invention makes use of several mechanisms for producing an enhanced rear-wheel steering experience. It is important to note the following structural properties depicted in FIG. 14, in order to understand the said different mechanisms for enhanced rear-wheel steering:

The rear wheel set [1100] is not explicitly marked in FIG. 14. It comprises at least part of: the tires [102], wheel disks [103] and wheel hubs [104].

The vehicle's standing platform [114] is angled upwards [121], towards the end of the vehicle, parallel to the rear roll axis [109]. Angle [118] complements angle [121] to 90 degrees (i.e. angle [118]=90°−angle [121]).

Distance vector [112] is the vector perpendicular to the roll axis [109], intercepting the wheel's point of contact with the ground.

Line 120A is substantially perpendicular to the ground. It intercepts the wheel's contact point with the ground, marking the position through which the ground's reactive force's action line passes.

The angled structure [121] displaces the midpoint of the rear wheels from beneath the elastic joints set [110a, 110b, 110c, 110d] to an extended position towards the rear of the vehicle, and elongates the distance vector [112].

Lines [119a] and [119b] respectively mark the vertical and horizontal vector components of the rear roll axis [109].

Vertical line [119a] is substantially perpendicular to the ground, and intercepts the rear roll axis [109]. This line marks the axis along which the rear wheel set yaws according to the mechanisms explained in the following paragraphs.

According to the embodiment depicted in FIG. 14, wherein the elastic pivot structure comprises two pairs of elastic joints ([110a, 110c] and [110b, 110d]), the vertical line [119a] intercepts the rear roll axis [109] at substantially the midpoint between the two bolts [110k], i.e. between elastic joints pairs [110a, 110c] and [110b, 110d].

According to other embodiments, wherein the elastic pivot structure only comprises a single pair of elastic joints ([110a, 110b], see FIG. 5), the vertical line [119a] intercepts the rear roll axis [109] at the location of the single pair of joints [110a, 110b].

Horizontal line [120b] is marks the rear wheels' yaw force moment's distance vector. Its length spreads the horizontal distance between vertical line 119a and the wheel's contact point with the ground. This distance vector is elongated as the angle [121] is increased (and angle [118] is decreased).

The 1$^{st}$ said mechanism for enhanced rear wheel steering is based on applying a lateral, horizontal force [300] on the chassis [1010]. Such a force [300] may be applied, for example by laterally swaying the driver's weight as in a surfing motion, or by steering the vehicle in a sharp turn (e.g. by using the steering handle) and thus producing a lateral centrifugal force.

The ground [101] reacts to the applied lateral force [300] by a reactive, friction force [400b] (see FIG. 7), originating from the wheel's point of contact with the ground (interception of line [120a] with the ground [101]).

The combination of the applied, lateral, horizontal force [300] and the ground's reaction force [400b] produces a force moment, acting along distance vector [120b]. This force moment causes the rear wheel set [1100] to yaw along the vertical line [119a], and heightens the vehicle's rear wheel steering in response to an applied lateral, horizontal force [300]. The elongation of distance vector [120b] by the angle [121] increases the force moment applied by the ground's reaction force [400b], and amplifies the said yaw motion.

The 2$^{nd}$ said mechanism for enhanced rear wheel steering is also based on applying a lateral, horizontal force [300] on the chassis [1010]. The combination of the applied, lateral, horizontal force [300] and the ground's reaction force [400b] produces a force moment, acting along the vertical line [119a]. This force moment causes the rear wheel set [1100] to tilt along horizontal line [119b], and heightens the vehicle's rear wheel steering in response to an applied lateral, horizontal force [300].

The elongation of said distance vector [112] that is perpendicular to said rear roll axis [109] by the angle of the chassis [1010] increases the force moment applied by the ground's reaction force [400b], and amplifies the said rear wheel's tilt motion.

The 3$^{rd}$ said mechanism for enhanced rear wheel steering is based on applying an uneven vertical force [600] to the vehicle's chassis [1010], for example by applying most of the driver's weight to one side of the standing platform [114] (see FIG. 3).

The said applied uneven vertical force [600] to the vehicle's chassis [1010] and associated platform [114] causes the following:

The chassis [1010] pivots along the horizontal vector component [119b] of roll axis [109] in relation to the middle suspension plate [110e], and the associated rear wheel set [1100].

The chassis' [1010] said pivot motion exerts a moment along the distance vector [120b], causing the wheel to yaw in the direction of turning along a vertical axis (line [119b]), thus further heightening the vehicle's rear wheel steering. strive The wheels of the rear wheel set, which are normally driven by a common mechanical or electric force, tend to rotate at the same speed. For this reason, the effect of the said 1$^{st}$ and 2$^{nd}$ mechanisms for enhanced rear wheel steering, involving the application of a lateral, horizontal force may be dampened by the wheels' common drive force.

The 4$^{th}$ mechanism for obtaining enhanced rear wheel steering is designed to tackle this issue, by combining the merits of the previously discussed mechanisms. It is based on translating a lateral, horizontal movement of the chassis [1010] to a tilt movement of the chassis [1010] along the rear roll axis [109], and exploiting the said 3$^{rd}$ mechanism to produce a yaw motion of the rear wheels' set.

As discussed above in relation to FIG. 12c, the ball joint [110n] is configured to translate a horizontal movement of the chassis [1010] to a tilt motion along the rear roll axis [109]. Therefore, when the ball joint [110n] is installed, a horizontal lateral force [300] applied to the chassis (e.g. by a driver swaying his/her body weight, as in a surfing motion) produces a tilt of the chassis [1010] and the associated standing platform [114] along the rear roll axis [109]. The said tilt yaws the rear wheel set [1100] along the vertical line [119a], as explained in regards to the 3$^{rd}$ mechanism, above. The said yaw further enhances the vehicle's rear wheel steering capability.

The production of rear wheel steering via the action of the ball joint [110n] (i.e. by the effect of the said 4$^{th}$ mechanism) is directly influenced by the number of installed ball joints [110n] in the rear elastic pivot structure [100]:

When no ball joints are installed, the 4$^{th}$ mechanism will take no effect on the rear wheel steering.

When one ball joint [110n] is installed, the 4$^{th}$ mechanism will have a mild effect on the rear wheel steering.

When all ball joints [110n] are installed, the 4$^{th}$ mechanism will have a heightened effect on the rear wheel steering, enabling a driver to easily tilt the chassis [1010] and yaw the rear wheel set [1100] by applying a lateral, horizontal force to the chassis [1010].

The invented vehicle enables the driver to lock the rear wheels together in a synchronized mode, forcing the wheels to rotate at the same speed as in a differential lock. According to some embodiments, the said lock may be obtained electronically, by providing a synchronized electric control signal to both wheels of the rear wheel set. According to another embodiment, the said lock may be obtained mechanically, by physically associating the rear wheels through a joint axle.

A 5$^{th}$ mechanism for enhanced rear wheel steering is based on this rear-wheel locking capability:

As well known to persons familiar with the art, locking of the rear wheels (as in a differential lock) produces superior traction, and is beneficial in specific types of terrain. However, such a lock limits the vehicle's steering capability. The invented vehicle overcomes the said limitation, while maintaining the property of superior traction.

When the rear wheels are locked, and the steering handle is turned, the chassis [1010] inertia produces a velocity vector that is not directly aligned with the vehicle's momentary direction of travel. The chassis [1010] inertia comprises a lateral velocity vector that is perpendicular to the vehicle's momentary direction of travel.

As discussed above, in relation to the 4$^{th}$ mechanism for obtaining enhanced rear wheel steering, the ball joint [110n] translates the said lateral velocity vector to a tilt of the chassis along the rear roll axis [109]. This tilt, in turn, yaws the rear wheels in the required direction, as explained in relation to the 4$^{th}$ mechanism for obtaining enhanced rear wheel steering.

As a result, locking the rear wheels, while steering the vehicle by the steering handle, causes the chassis [1010] to tilt along the rear roll axis, and yaw the rear wheels, thus enhancing the vehicle's rear wheel steering capabilities.

The invented vehicle provides the sensation of surfing to the steering of the vehicle. As described above, when the driver of the vehicle shifts their weight, the standing platform [114] is pivoted along the horizontal vector component [119B] of roll axis [109]. The said pivot action provides the user a surfing sensation as they steer the vehicle by swaying their weight from side to side.

The rigidity of the elastic joints [110a, 110b, 110c, 110d] has an effect on the riding experience. Rigid joints will restrain the swivel of the standing platform 114, restrict the driver's ability to shift their weight and impose a constrained, stable quality to the ride. In a complementary manner, loose or soft elastic joints [110a, 110b, 110c, 110d] will reduce the vehicle's stability, heighten steering capabilities, and provide an enhanced surfing sensation to the drive. According to some embodiments of the invented vehicle, the rigidity of the elastic joints [110a, 110b, 110c, 110d] may be configurable. For example, they may be made of rubber, and their rigidity may be configured by tightening or loosening the elastic joint bolts [110k].

The sprung members of the suspension are hereby defined as the components that exhibit a fixed position in relation to the vehicle's chassis [1010]. In the invented vehicle, the rear sprung members of suspension comprise the standing platform [114], shock absorber [105], upper and middle suspension plates [110f] and [110e] respectively, lower suspension connector[110i], elastic joints [110a, 110b, 110c, 110d], and elastic joint bolts [110k].

The unsprung members of the suspension are hereby defined as the components that bear the load between the ground and the shock absorber, and follow the terrain, i.e. present a fixed position in relation to the ground [101]. In the invented vehicle, the rear unsprung members of suspension comprise of the rear wheel set [1100] (i.e. the tires [102], the wheel disks [103] and the wheel hubs [104]) and the axle [115].

Figure 15:
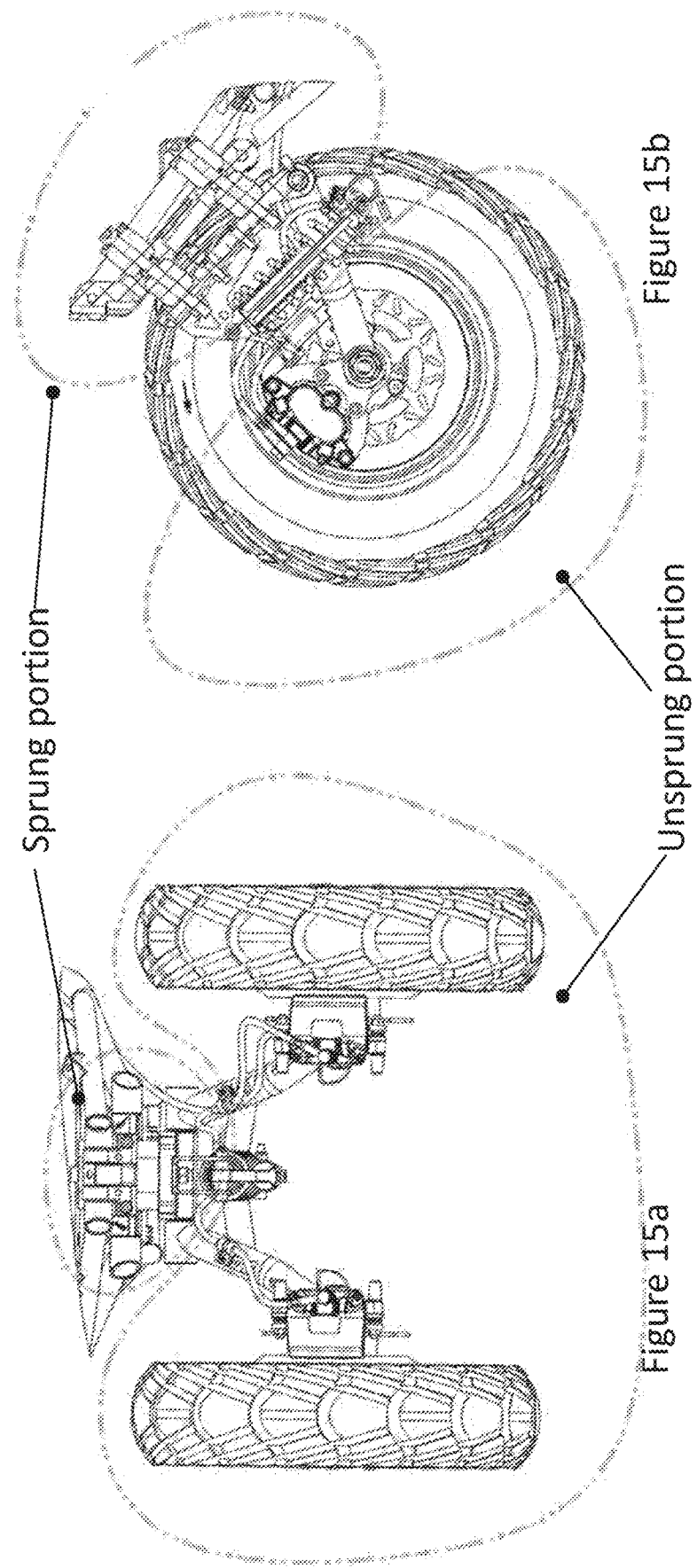
FIGS. 15a and 15b respectively show a rear view and a lateral section view of the rear end of the vehicle, depicting a schematic division of the different components of the rear suspension part to a sprung portion and an unsprung portion, according to some embodiments.

FIGS. 15a and 15b respectively show a rear view and a lateral section view of the rear end of the vehicle, depicting a schematic division of the different components of the rear suspension part to a sprung portion and an unsprung portion, according to some embodiments.

This embodiment of the rear suspension part provides a unique shock absorption mechanism that enables the vehicle to closely follow a rugged terrain, while maintaining a smooth driving experience.

The unsprung members of the rear suspension are minimal. They include only the rear wheel set [1100] and the rear axle [115], and do not include the top and middle suspension plates ([110f] and [110e]), the elastic joint components [110a, 110b, 110c, 110d], or the elastic joint bolts [110k]. This property of the rear suspension's unsprung portion reduces the unsprung portion's mass, and facilitates close and rapid following of the terrain through pitch movement of the rear pitch pivot axle [117].

Shocks applied to the unsprung components are absorbed by the shock absorber [105]. The shock absorber primarily damps shocks in the pitch direction. The current invention does not impose any restrictions on the type of the said shock absorber (e.g. hydraulic, pneumatic, springs etc) or any combination thereof. The elastic joints [110a, 110b, 110c, 110d] provide additional shock absorption, damping shocks mainly in the roll direction.

According to this embodiment, the sprung components are further divided by the elastic joints [110a, 110b, 110c, 110d] in regards to movement in the roll axis:

The shock absorber [105] and the middle suspension plate [110e] follow the terrain's roll movement.

The elastic joints [110a, 110b, 110c, 110d] cushion the terrain's roll movements, such that all other components of the vehicle's sprung mass advance smoothly over the terrain, cushioned in both the pitch and roll axes.

The number of components located between the ground and the elastic joints [110a, 110b, 110c, 110d] is minimal. They include the unsprung components (tires [102], wheel disks [103], wheel hubs [104] and axle [115]), the shock absorber [105] and the middle suspension plate [110e]. This implementation ensures a minimal mass between the ground and the elastic joints [110a, 110b, 110c, 110d], facilitating a smooth roll movement to follow the rugged terrain.

Figure 16:
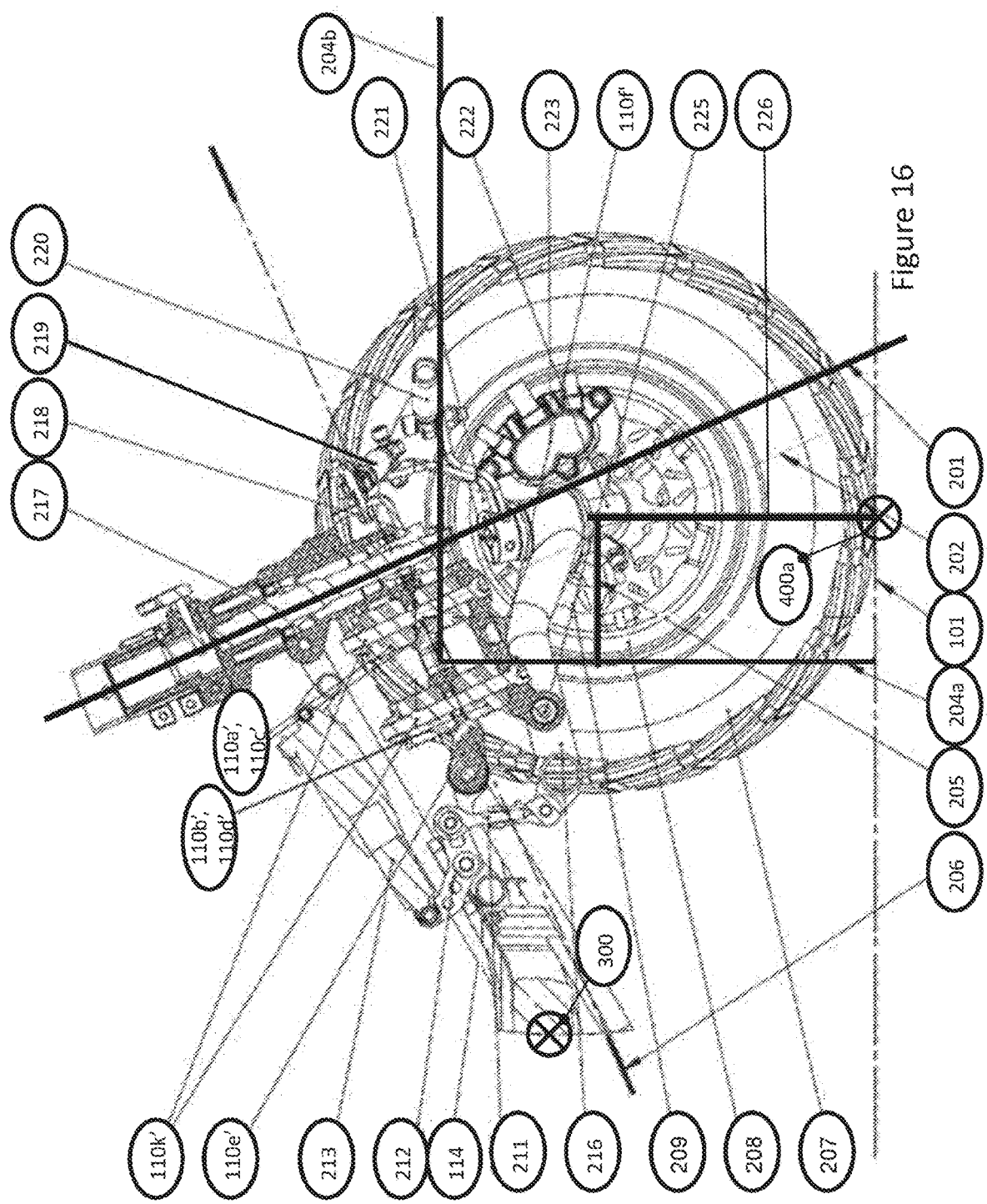
FIG. 16 presents a detailed lateral section view of the front end of the vehicle, according to some embodiments.

FIG. 16 presents a detailed lateral section view of the front end of the vehicle, according to some embodiments. In this figure, the proximal wheel parts have been removed to provide a clear view of the structure.

The present invention makes use of several mechanisms for producing an enhanced front-wheel steering experience. It is important to note the following structural properties depicted in FIG. 16, in order to understand the said different mechanisms for enhanced front-wheel steering:

The front wheel set [1200] is not explicitly marked in FIG. 16. It comprises at least part of: the tires [207], the wheel disks [208], and the disk brakes [209] and brake pistons [223].

Line [226] is substantially perpendicular to the ground. It intercepts the wheel's contact point with the ground, marking the position through which the ground's reactive force's action line passes.

The vehicle's chassis [1010] is angled upwards, towards the front of the vehicle, parallel to the front roll axis [206].

The said angled structure displaces the midpoint of the front wheels from beneath the front elastic joints' set [110a', 110b', 110c', 110d'] to an extended position towards the front of the vehicle.

The vertical Line [204a] is perpendicular to the ground, and intercepts the front roll axis [206].

According to the embodiment depicted in FIG. 16, wherein the elastic pivot structure [200] comprises two pairs of elastic joints ([110a', 110c'] and [110b', 110d']), the vertical line [204a] intercepts the front roll axis [206] at substantially the midpoint between the two bolts [110k'], i.e. between elastic joints pairs [110a', 110c'] and [110b', 110d'].

According to other embodiments, wherein the elastic pivot structure [200] only comprises a single pair of elastic joints ([110a', 110b'], see FIG. 4), the vertical line [204a] intercepts the front roll axis [206] at the location of the single pair of elastic joints [110a', 110b'].

Horizontal Line [204b] is parallel to the ground, and intercepts the front roll axis [206] substantially at the mid-point between the bolts [110k'].

Line [205] is the wheels yaw force moment's distance vector. This distance vector is elongated as the angle of the front roll axis [206] is increased.

The $1^{st}$ said mechanism for enhanced front wheel steering is based on applying a lateral, horizontal force [300] on the chassis [1010]. Such a force [300] may be applied, for example by laterally swaying the driver's weight as in a surfing motion, or by steering the vehicle in a sharp turn (e.g. by using the steering handle) and thus producing a lateral centrifugal force.

The ground [101] reacts to the applied lateral force [300] by a reactive, friction force [400a] (see FIG. 7), originating from the wheel's point of contact with the ground (marked by line [226]).

The combination of the applied, lateral, horizontal force [300] and the ground's reaction force [400a] (see FIG. 7) produces a force moment, acting along distance vector [205]. This force moment causes the front wheel set [1200] to yaw along the vertical line [204a], and heightens the effect of front wheel steering in response to an applied lateral, horizontal force [300]. The elongation of distance vector [205] by the angle of the front roll axis [206] increases the force moment applied by the ground's reaction force [400a], and amplifies the said yaw motion.

The $2^{nd}$ said mechanism for enhanced front wheel steering is based on applying an uneven vertical force [600] to the vehicle's chassis [1010], for example by applying most of the driver's weight to one side of the standing platform [114] (see FIG. 3).

The said applied uneven vertical force [600] to the vehicle's chassis [1010] and associated platform [114] causes the following:

The chassis [1010] pivots along the horizontal vector component (marked by line [204b]) of the front roll axis [206], in relation to the front wheel set [1200].

The chassis' [1010] said pivot motion exerts a moment along the distance vector [205], causing the wheel to yaw in the direction of turning along a vertical axis [204a], thus further heightening the effect of front wheel steering.

The $3^{rd}$ mechanism for obtaining enhanced front wheel steering combines the merits of the previously discussed mechanisms. It is based on translating a lateral, horizontal movement of the chassis [1010] to a tilt movement of the chassis [1010] along the front roll axis [206], and exploiting the said $2^{nd}$ mechanism to produce a yaw motion of the front wheels set.

As discussed above in relation to FIG. 12c, the ball joint [110n'] is configured to translate a horizontal movement of the chassis [1010] to a tilt motion along the front roll axis [109]. Therefore, when the ball joint [110n'] is installed, a horizontal lateral force [300] applied to the chassis (e.g. by a driver swaying their body weight, as in a surfing motion) will produce a tilt of the chassis [1010] and the associated standing platform [114] along the front roll axis [109]. The said tilt will, in turn, cause the front wheel set [1100] to yaw along the vertical line [204a], as explained in regards to the $2^{nd}$ mechanism, above. The said yaw will further enhance the vehicle's front wheel steering capability.

The production of front wheel steering via the action of the ball joint [110n'] (i.e. by the effect of the said $3^{rd}$ mechanism) is directly influenced by the number of installed ball joints [110n'] in the front elastic pivot structure [200]:

When no ball joints are installed, the $3^{rd}$ mechanism will take no effect on the front wheel steering.

When one ball joint [110n'] is installed, the $3^{rd}$ mechanism will have a mild effect on the front wheel steering.

When both ball joints [110n] are installed, the $3^{rd}$ mechanism will have a heightened effect on the front wheel steering, enabling a driver to easily tilt the chassis [1010] and yaw the front wheel set [1100] by applying a lateral, horizontal force to the chassis [1010].

The members of the unsprung portion of the front wheel suspension are minimal. They include the wheel sets (i.e. tires [207], wheel disks [208], disk brakes [209] and brake pistons [223]) and the front axle [216]. They do not include the shock absorber [213], extensions to the shock absorber [211] and [212], upper and middle suspension plates [110f'] and [110e'] respectively, elastic joints [110a', 110b', 110c', 110d'], elastic joint bolts [110k'], and the handle joints [217].

This property of the front wheel suspension's unsprung portion reduces the unsprung portion's mass, and facilitates close and rapid following of the terrain through pitch movement of the front shock absorber [213].

Shocks applied to the unsprung components are absorbed by the shock absorber [213]. The shock absorber primarily damps shocks in the pitch direction. The current invention does not impose any restrictions on the type of the said shock absorber (e.g. hydraulic, pneumatic, springs etc) or any combination thereof. The elastic joints [210] provide additional shock absorption, damping shocks mainly in the roll direction.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A vehicle comprising:
a front wheel set [1200] and a rear wheel set [1100], each set comprising two wheels and an axle [115, 216] attached to the said wheels;
a base structure or chassis [1010];
a front elastic pivot structure [200], connecting the front wheel set [1200] to the chassis, wherein said front elastic pivot structure [200] comprises a front set of at least one elastic joint [110a', 110b', 110c', 110d'], enabling the chassis [1010] to tilt along a front roll axis [206] in respect to the said front wheel set [1100];
a front shock absorber [213], associated with the front wheel set [1200];
a rear elastic pivot structure [100], associated with the rear wheel set [1100], wherein said rear elastic pivot structure [100] comprises a rear set of at least one elastic joint [110a, 110b, 110c, 110d], enabling the chassis [1010] to tilt along a rear roll axis [109] in respect to the said rear wheel set [1100]; and
a rear shock absorber [105], associated with the rear wheel set [1100];
wherein said rear elastic pivot structure [100] comprises an upper suspension plate [110f] and a middle suspension plate [110e];
wherein said upper suspension plate [110f] of the rear elastic pivot structure [100] is attached to the said chassis [1010];
wherein said middle suspension plate [110e] of the rear elastic pivot structure [100] is attached to the rear wheel set [1100] and rear shock absorber [105];
wherein said plates [110f, 110e] are attached via one or more elastic joints [110a, 110b], thereby enabling the said plates [110f, 110e] to tilt in respect to each other along a roll axis, facilitating a tilt of the chassis [1010] in respect to the rear wheel set [1100] along a rear roll axis [109];
wherein said front elastic pivot structure [200] comprises an upper suspension plate [110f'] and a middle suspension plate [110e'];
wherein said upper suspension plate [110f'] of the front elastic pivot structure [200] is attached to the said chassis [1010];
wherein said middle suspension plate [110e'] of the front elastic pivot structure [200] is attached to the front wheel set [1200] and front shock absorber [213]; and said plates [110e', 110f'] are attached via one or more elastic joints [110a', 110b' ], thereby enabling the said plates [110e', 110f'] to tilt in respect to each other along a roll axis, facilitating a tilt of the chassis [1010] in respect to the front wheel set [1200] along a front roll axis [206];
wherein said chassis [1010] comprises a substantially horizontal standing platform [114], capable of carrying at least one driver;
wherein said front elastic pivot structure [200] and rear elastic pivot structure [100] are substantially vertically aligned, thus the imaginary line [500] connecting said elastic pivot structures [100, 200] is substantially horizontal; and
wherein said horizontal standing platform [114] is lower than the horizontal line [500] connecting said front elastic pivot structure [200] and rear elastic pivot structure [100].

2. The vehicle of claim 1, wherein said elastic joints [110a, 110b, 110c, 110d, 110a', 110b', 110c', 110d'] are implemented as springs or pistons or any combination thereof.

3. The vehicle of claim 2, wherein the chassis [1010] is directly attached to the said elastic joints [110a, 110b, 110c, 110d, 110a', 110b', 110c', 110d'].

4. The vehicle of claim 3, wherein:
the chassis' [1010] front part is angled upwards, toward the front of the vehicle along the said front roll axis [206];
said angle displaces the midpoint of the rear wheels from beneath the rear elastic joints set [110a', 110b', 110c', 110d'] to an extended position towards the front of the vehicle; and
said angle of the chassis [1010] elongates a horizontal distance vector [205], between the horizontal positions of the wheel's contact point with the ground and the mid-point between the front elastic joints [110a', 110b', 110c', 110d'].

5. The vehicle of claim 1, enabling the driver to lock the wheels of the rear wheel set [1100] together, forcing them to rotate at the same speed in a synchronized mode, by providing a synchronized electric control signal to both wheels of the rear wheel set.

6. The vehicle of claim 5 wherein the said lock is obtained mechanically, by physically associating the rear wheels through a joint axle.

7. The vehicle of claim 1, wherein the components bearing the load between the ground and said rear shock absorber [105] include only the rear wheel set [1100] and the rear axle, and do not include said suspension plates [110f, 110e], elastic joints [110a, 110b, 110c, 110d], and said elastic joint bolts [110k], thus minimizing the total mass that follows the ground through pitch movement of a rear pitch pivot axle [117].

8. The vehicle of claim 7 wherein the components bearing the load between the ground and the elastic joints [110a, 110b, 110c, 110d] of the rear wheel set [1100] is minimal, and includes only the said rear wheel set [1100], the rear axle, said rear shock absorber [105] and said medium suspension plate [110e], thus minimizing the mass of the load-bearing components between the ground and the elastic joints, and enhancing the following of the ground in roll motion.

9. A vehicle comprising:
a front wheel set [1200] and a rear wheel set [1100], each set comprising two wheels and an axle [115, 216] attached to the said wheels;
a base structure or chassis [1010];
a front elastic pivot structure [200], connecting the front wheel set [1200] to the chassis, wherein said front elastic pivot structure [200] comprises a front set of at least one elastic joint [110a', 110b', 110c', 110d'], enabling the chassis [1010] to tilt along a front roll axis [206] in respect to the said front wheel set [1100];
a front shock absorber [213], associated with the front wheel set [1200];
a rear elastic pivot structure [100], associated with the rear wheel set [1100], wherein said rear elastic pivot structure [100] comprises a rear set of at least one elastic joint [110a, 110b, 110c, 110d], enabling the chassis [1010] to tilt along a rear roll axis [109] in respect to the said rear wheel set [1100]; and
a rear shock absorber [105], associated with the rear wheel set [1100];
wherein said rear elastic pivot structure [100] comprises an upper suspension plate [110f] and a middle suspension plate [110e];
wherein said upper suspension plate [110f] of the rear elastic pivot structure [100] is attached to the said chassis [1010];
wherein said middle suspension plate [110e] of the rear elastic pivot structure [100] is attached to the rear wheel set [1100] and rear shock absorber [105];
wherein said plates [110f, 110e] are attached via one or more elastic joints [110a, 110b], thereby enabling the said plates [110f, 110e] to tilt in respect to each other along a roll axis, facilitating a tilt of the chassis [1010] in respect to the rear wheel set [1100] along a rear roll axis [109];
wherein said front elastic pivot structure [200] comprises an upper suspension plate [110f'] and a middle suspension plate [110e'];
wherein said upper suspension plate [110f'] of the front elastic pivot structure [200] is attached to the said chassis [1010];
wherein said middle suspension plate [110e'] of the front elastic pivot structure [200] is attached to the front wheel set [1200] and front shock absorber [213]; and
said plates [110e', 110f'] are attached via one or more elastic joints [110a', 110b'], thereby enabling the said plates [110e', 110f'] to tilt in respect to each other along a roll axis, facilitating a tilt of the chassis [1010] in respect to the front wheel set [1200] along a front roll axis [206]; and
wherein said elastic pivot structures [100, 200] comprise a set of two elastic rubber joints, secured between the middle suspension plate [110e', 110e] and the upper suspension plate [110f', 110f] by a set of bolts [110k', 100k].

10. The vehicle of claim 9, wherein said elastic pivot structures [100, 200] further comprise a set of elastic rubber joints [110c, 110d, 110c', 110d'], secured above the upper suspension plate [110f', 110f] by the same set of bolts [110k', 110k], between the upper suspension plate [110f', 110f] and a set of tighteners [110l', 110l].

11. The vehicle of claim 10, wherein:
said upper suspension plate [110f] of the elastic pivot structure [100, 200] further comprises a housing [110q, 110q'] for holding said rubber elastic joints [110c, 110d, 110c', 110d']; and
said housings comprise a groove [110s, 110s'], enabling said bolts [110k, 110k'] to move laterally in respect to said upper suspension plate [110f, 110f'], hence enabling said upper suspension plate [110f, 110f'] to move laterally in relation to said middle suspension plate [110e, 110e'], and enabling said chassis [1010] to move laterally in relation to said wheel sets [1100, 1200].

12. The vehicle of claim 11, wherein:
said rear elastic pivot structure [100] further comprises at least one ball joint [110n], attached to the upper suspension plate [110f], in the location of said housing [110q];
wherein said ball joint(s) [110n] are configured to secure said bolts [110k] into place and prevent said bolts from moving laterally along said grooves [110s], thus preventing said upper suspension plate [110f] from moving laterally in relation to said middle suspension plate [110e]; and
wherein said ball joint(s) [110n] are configured to enable the bolts [110k] to rotate around the location of said ball joint(s) [110n], hence enabling said upper suspension plate [110f] to tilt in relation to said middle suspension plate [110e], and enabling the chassis [1010] to tilt along the rear roll axis [109] in relation to the rear wheel set [1100].

13. The vehicle of claim 12, wherein the said ball joints [110n, 110n'] may be fully installed or partially installed or not installed within the front elastic pivot structure [100] and rear elastic pivot structure [200], to produce different levels of front and rear wheel steering in response to a lateral, horizontal force [300] applied to the chassis [1010].

14. The vehicle of claim 11, wherein:
said front elastic pivot structure [200] further comprises at least one ball joint [110n'] attached to the upper suspension plate [110f'], in the location of said housing [110q'];
wherein said ball joint(s) [110n'] are configured to secure said bolts [110k'] into place and prevent said bolts from moving laterally along said grooves [110s'], thus preventing the said upper suspension plate [110f'] from moving laterally in relation to said middle suspension plate [110e']; and wherein said ball joint(s) [110n'] are configured to enable the bolts [110k'] to rotate around the location of said ball joint(s) [110n'] hence enabling said upper suspension plate [110f'] to tilt in relation to said middle suspension plate [110e'], and enabling the chassis [1010] to tilt along the front roll axis [206] in relation to the front wheel set [1200].

15. A vehicle comprising:

a front wheel set [1200] and a rear wheel set [1100], each set comprising two wheels and an axle [115, 216] attached to the said wheels;

a base structure or chassis [1010];

a front elastic pivot structure [200], connecting the front wheel set [1200] to the chassis, wherein said front elastic pivot structure [200] comprises a front set of at least one elastic joint [110a', 110b', 110c', 110d'], enabling the chassis [1010] to tilt along a front roll axis [206] in respect to the said front wheel set [1100];

a front shock absorber [213], associated with the front wheel set [1200];

a rear elastic pivot structure [100], associated with the rear wheel set [1100], wherein said rear elastic pivot structure [100] comprises a rear set of at least one elastic joint [110a, 110b, 110c, 110d], enabling the chassis [1010] to tilt along a rear roll axis [109] in respect to the said rear wheel set [1100]; and a rear shock absorber [105], associated with the rear wheel set [1100];

wherein said rear elastic pivot structure [100] comprises an upper suspension plate [110f] and a middle suspension plate [110e];

wherein said upper suspension plate [110f] of the rear elastic pivot structure [100] is attached to the said chassis [1010];

wherein said middle suspension plate [110e] of the rear elastic pivot structure [100] is attached to the rear wheel set [1100] and rear shock absorber [105];

wherein said plates [110f, 110e] are attached via one or more elastic joints [110a, 110b], thereby enabling the said plates [110f, 110e] to tilt in respect to each other along a roll axis, facilitating a tilt of the chassis [1010] in respect to the rear wheel set [1100] along a rear roll axis [109];

wherein said front elastic pivot structure [200] comprises an upper suspension plate [110f'] and a middle suspension plate [110e'];

wherein said upper suspension plate [110f'] of the front elastic pivot structure [200] is attached to the said chassis [1010];

wherein said middle suspension plate [110e'] of the front elastic pivot structure [200] is attached to the front wheel set [1200] and front shock absorber [213]; and said plates [110e', 110f'] are attached via one or more elastic joints [110a', 110b'], thereby enabling the said plates [110e', 110f'] to tilt in respect to each other along a roll axis, facilitating a tilt of the chassis [1010] in respect to the front wheel set [1200] along a front roll axis [206];

wherein said elastic joints [110a, 110b, 110c, 110d, 110a', 110b', 110c', 110d'] are implemented as springs or pistons or any combination thereof;

wherein the chassis [1010] is directly attached to the said elastic joints [110a, 110b, 110c, 110d,110a', 110b', 110c', 110d'];

wherein the chassis' [1010] rear part is angled upwards, toward the rear of the vehicle along the said rear roll axis [109];

wherein said angle displaces the midpoint of the rear wheels from beneath the rear elastic joints set [110a, 110b, 110c, 110d] to an extended position towards the rear of the vehicle;

wherein said angle of the chassis [1010] elongates a distance vector [112], that is perpendicular to said rear roll axis [109], and intercepts the rear wheels' point of contact with the ground; and wherein said angle of the chassis [1010] elongates a horizontal distance vector [120b], between the horizontal positions of the wheel's contact point with the ground and the mid-point between the rear elastic joints.

* * * * *